United States Patent
Hu

(10) Patent No.: US 12,520,186 B2
(45) Date of Patent: Jan. 6, 2026

(54) APPLICATION LAYER MEASUREMENT COLLECTION METHOD AND COMMUNICATION APPARATUS

(71) Applicant: Huawei Technologies Co., Ltd., Shenzhen (CN)

(72) Inventor: Xingxing Hu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 18/751,824

(22) Filed: Jun. 24, 2024

(65) Prior Publication Data

US 2024/0349109 A1 Oct. 17, 2024

Related U.S. Application Data

(63) Continuation of application No. PCT/CN2022/141331, filed on Dec. 23, 2022.

(30) Foreign Application Priority Data

Dec. 25, 2021 (CN) .......................... 202111605375.7

(51) Int. Cl.
*H04W 24/10* (2009.01)

(52) U.S. Cl.
CPC .................................... *H04W 24/10* (2013.01)

(58) Field of Classification Search
None
See application file for complete search history.

(56) References Cited

U.S. PATENT DOCUMENTS

| 2023/0080089 A1 | 3/2023 | Hu et al. |
| 2023/0156767 A1* | 5/2023 | Hu ........... H04B 17/252 370/329 |
| 2023/0247466 A1* | 8/2023 | Li ............ H04W 24/08 370/252 |

(Continued)

FOREIGN PATENT DOCUMENTS

| CN | 113115331 A | 7/2021 |
| CN | 113556776 A | 10/2021 |

(Continued)

OTHER PUBLICATIONS

3GPP TSG-RAN WG3 Meeting #111-e R3-210527 "pCR for TR 38.890: Handling of QoE Measurement and Reporting and Support for New Services", Ericsson Jan. 25-Feb. 4, 2021, total 12 pages.

(Continued)

*Primary Examiner* — Quang N Nguyen
(74) *Attorney, Agent, or Firm* — Slater Matsil, LLP

(57) ABSTRACT

This application provides an application layer measurement collection method, and a communication apparatus and system. The method includes: A first access network device requests, based on a request from a second access network device, a terminal device to suspend reporting, to the second access network device, measurement results corresponding to all or some of one or more application layer measurement tasks that are configured by the first access network device for the terminal device. According to the method, air interface load balancing of nodes can be supported, to avoid congestion of a network air interface and improve network operation efficiency.

16 Claims, 5 Drawing Sheets

(56) References Cited

U.S. PATENT DOCUMENTS

2023/0379743 A1* 11/2023 Hu .......................... H04W 4/50
2024/0163719 A1* 5/2024 Hu ......................... H04W 28/06
2025/0254111 A1* 8/2025 Dai ..................... H04L 41/5067

FOREIGN PATENT DOCUMENTS

| CN | 115868197 A | 3/2023 |
|----|-------------|--------|
| WO | 2021098074 A1 | 5/2021 |
| WO | 2021228095 A1 | 11/2021 |

OTHER PUBLICATIONS

3GPP TS 26.247 V16.5.1 (Dec. 2021) 3rd Generation Partnership Project;Technical Specification Group Services and System Aspects;Transparent end-to-end Packet-switched Streaming Service(PS-S);Progressive Download and Dynamic Adaptive Streaming over HTTP (3GP-DASH). Dec. 2021, total 140 pages.
3GPP TS 26.114 V17.3.0 (Dec. 2021) 3rd Generation Partnership Project;Technical Specification Group Services and System Aspects;IP Multimedia Subsystem (IMS);Multimedia Telephony;Media handling and interaction, Dec. 2021, total 95 pages.
3GPP TS 36.413 V16.8.0 (Dec. 2021) 3rd Generation Partnership Project;Technical Specification Group Radio Access Network;Evolved Universal Terrestrial Radio Access Network (E-UTRAN);S1 Application Protocol(S1AP), Dec. 2021, total 110 pages.

* cited by examiner

APPLICATION LAYER MEASUREMENT COLLECTION METHOD AND COMMUNICATION APPARATUS

CROSS-REFERENCE TO RELATED APPLICATIONS

This application is a continuation of International Application No. PCT/CN2022/141331, filed on Dec. 23, 2022, which claims priority to Chinese Patent Application No. 202111605375.7, filed on Dec. 25, 2021. The disclosures of the aforementioned applications are hereby incorporated by reference in their entireties.

TECHNICAL FIELD

This application relates to the communication field, and more specifically, to an application layer measurement collection method and a communication apparatus.

BACKGROUND

For some streaming services or voice services, for example, a streaming service and a multimedia telephony service for an internet protocol (IP) multimedia subsystem (multimedia telephony service for IMS, MTSI), signal quality alone cannot reflect user experience in using the services. An operator learns of user experience, to better optimize a network and improve user experience. This type of measurement collection may be referred to as quality of experience (QoE) measurement collection (QMC), or may be referred to as application layer measurement collection (application layer measurement for short). During QoE measurement collection, an access network device receives, from a core network (CN) or an operations, administration and maintenance (OAM) entity, measurement configuration information used for application layer measurement, and sends the measurement configuration information to a terminal device. After obtaining a measurement result based on the measurement configuration information, the terminal device sends the measurement result to the access network device. When load of the access network device is high, the access network device may further notify the terminal device to suspend reporting the measurement result to the access network device. In this case, the terminal device may continue to perform measurement but does not report the measurement result.

In a multi-radio dual connectivity (MR-DC) architecture, a terminal device may simultaneously have communication connections to at least two access network devices, and may send and receive data. In the at least two access network devices, an access network device that is responsible for exchanging a radio resource control message with the terminal device and interacting with a core network control plane entity may be referred to as a master node (MN), and another access network device may be referred to as a secondary node (SN). In this scenario, after receiving measurement configuration information of application layer measurement from the MN or the SN, how the terminal device reports a measurement result corresponding to the measurement configuration information is a problem that needs to be studied.

SUMMARY

This application provides a communication method and apparatus, so that a terminal device can suspend reporting, to a second node based on an indication, measurement results corresponding to all or some of application layer measurement tasks that are configured by a first node, to balance air interface load of an access network device.

According to a first aspect, an application layer measurement collection method is provided. In the method, a first access network device requests, based on a request from a second access network device, a terminal device to suspend reporting, to the second access network device, measurement results corresponding to all or some of one or more application layer measurement tasks that are configured by the first access network device for the terminal device. Both the first access network device and the second access network device are access network devices. In this application, the access network device may also be referred to as an access network node, and is referred to as a node for short in subsequent descriptions of this application.

The method is described from a perspective of a first node, and may include:

sending, by a first node, at least one first application layer measurement configuration to a terminal device;

notifying, by the first node, the terminal device to report a measurement result corresponding to the at least one first application layer measurement configuration to a second node;

receiving, by the first node, first request information from the second node, where the first request information requests to suspend reporting, to the second node, measurement results corresponding to all or some of first application layer measurement configurations sent by the first node to the terminal device, and all the first application layer measurement configurations include the at least one first application layer measurement configuration; and sending, by the first node, second request information to the terminal device, where the second request information requests the terminal device to suspend reporting, to the second node, the measurement results corresponding to all or some of the first application layer measurement configurations sent by the first node to the terminal device, and all the first application layer measurement configurations include the at least one first application layer measurement configuration.

It may be understood that the second request information sent by the first node to the terminal device is in response to the first request information received by the first node from the second node.

Optionally, the first request information requests to suspend reporting, to the second node, a measurement result of a specific or non-specific first application layer measurement configuration.

Optionally, the second request information requests to suspend reporting, to the second node, a measurement result of a specific or non-specific first application layer measurement configuration.

The foregoing method provides a method for suspend reporting the measurement result of the application layer measurement configuration. The suspension method is specific to the application layer measurement configuration configured by the first node for the terminal device and the measurement result corresponding to the application layer measurement configuration is reported to the second node, so that air interface load balancing of nodes can be supported, to avoid congestion of a network air interface and improve network operation efficiency.

Optionally, the first application layer measurement configuration for which the second request information requests to suspend measurement result reporting to the second node is determined by the first node based on the first request information. For example, the first application layer measurement configuration involved in the second request information is completely the same as the first application layer measurement configuration involved in the first request information. To be specific, the first node does not additionally determine the first application layer measurement configuration for which measurement result reporting needs to be suspended. Alternatively, the first application layer measurement configuration involved in the second request information may be different from the first application layer measurement configuration involved in the first request information. For example, the first application layer measurement configuration involved in the first request information is non-specific, and the first application layer measurement configuration involved in the second request information is specific. For another example, both the first application layer measurement configuration involved in the first request information and the first application layer measurement configuration involved in the second request information are specific. However, the first application layer measurement configuration involved in the second request information is a part of the first application layer measurement configuration involved in the first request information, that is, the first node further determines the first application layer measurement configuration for which measurement result reporting needs to be suspended. The first node determines the first application layer measurement configuration for which measurement result reporting needs to be suspended, so that the first node may further determine the first application layer measurement configuration based on air interface load of the first node, to implement more refined management of air interface load balancing of the nodes. Further, because the first application layer measurement configuration is delivered by the first node to the terminal device, the first node has more detailed information about the first application layer measurement configuration, so that the first application layer measurement configuration involved in suspension can better meet a system requirement. In addition, overheads between nodes caused by sending information related to the first application layer measurement configuration to the second node, for example, a measurement priority and/or a visibility indicator, can be reduced.

According to the first aspect, in a first possible implementation of the first aspect, the method further includes:

receiving, by the first node, third request information from the second node, where the third request information requests to resume reporting, to the second node, the measurement results that correspond to all or some of the first application layer measurement configurations and that are suspended from reporting to the second node; and sending, by the first node, fourth request information to the terminal device, where the fourth request information requests the terminal device to resume reporting, to the second node, the measurement results that correspond to all or some of the first application layer measurement configurations and that are suspended from reporting to the second node, and some first application layer measurement configurations include the at least one first application layer measurement configuration.

It may be understood that the fourth request information is the third request information received by the first node in response to the first node.

Optionally, similar to the suspension manner in the first aspect, the third request information may request to resume reporting, to the second node, a measurement result of a specific or non-specific first application layer measurement configuration.

Optionally, similar to the suspension manner in the first aspect, the fourth request information requests to resume reporting, to the second node, a measurement result of a specific or non-specific first application layer measurement configuration.

For a specific resumption manner, refer to the descriptions of the suspension manner in the first aspect. Details are not described herein again.

According to the foregoing resumption method, the application layer measurement configuration configured by the first node for the terminal device can report the measurement result to the second node, so that air interface load balancing of the nodes can be supported, to avoid congestion of the network air interface and improve network operation efficiency.

According to the first aspect or the first possible implementation of the first aspect, in a second possible implementation of the first aspect, the notifying, by the first node, the terminal device to report a measurement result corresponding to the at least one first application layer measurement configuration to a second node may include:

sending, by the first node, first indication information to the terminal device, where the first indication information indicates to report, to the second node, the measurement result corresponding to the at least one first application layer measurement configuration, and the first indication information includes one or any combination of a first identifier of the at least one first application layer measurement configuration, a service type corresponding to the at least one first application layer measurement configuration, a measurement priority corresponding to the at least one first application layer measurement configuration, or a visibility indicator corresponding to the at least one first application layer measurement configuration. The first identifier may be an identifier allocated by a radio resource control (RRC) layer to the first application layer measurement configuration. The visibility indicator indicates that the first application layer measurement configuration is visible information or invisible information on an access network side.

Alternatively, the notifying, by the first node, the terminal device to report a measurement result corresponding to the at least one first application layer measurement configuration to a second node may include:

sending, by the first node, first indication information to the terminal device, where the first indication information indicates to report, to the second node, the measurement results corresponding to all the application layer measurement configurations sent by the first node to the terminal device, and all the application layer measurement configurations include the at least one first application layer measurement configuration.

The foregoing different notification manners may be predefined in a protocol, or may be determined by the first node based on a system requirement. This is not limited herein.

According to the first aspect or the first or the second possible implementation of the first aspect, in a third possible implementation of the first aspect, the first request information includes one or any combination of a second identifier of the at least one first application layer measurement configuration, a service type corresponding to the at least one first application layer measurement configuration, a measurement priority corresponding to the at least one first application layer measurement configuration, or a visibility indicator corresponding to the at least one first application layer measurement configuration. The second identifier and the foregoing first identifier may be identifiers of a same type, for example, both are identifiers allocated by the RRC layer to the first application layer measurement configuration, or the second identifier and the foregoing first identifier may be identifiers of different types, for example, the second identifier is a global identifier, for example, a QoE reference, and the global identifier is allocated by a core network (CN) element (CN for short), an operations, administration and maintenance (Operations, administration and maintenance, OAM) entity (OAM for short), or an element manager (EM) entity (EM for short).

Alternatively, the first request information requests to suspend reporting, to the second node, the measurement results corresponding to all the first application layer measurement configurations sent by the first node to the terminal device, or the first request information includes a suspend quantity indication for indicating a quantity of first application layer measurement configurations for which measurement result reporting is requested to be suspended.

In this way, the first request information may support various suspension manners, to support more refined management of the air interface load of the nodes.

According to the first aspect or the first to the third possible implementations of the first aspect, in a fourth possible implementation of the first aspect, the second request information meets one of the following:

the second request information includes one or any combination of the first identifier of the at least one first application layer measurement configuration, the corresponding service type, the measurement priority, or the visibility indicator; or the second request information requests the terminal device to suspend reporting, to the second node, the measurement results corresponding to all the first application layer measurement configurations sent by the first node to the terminal device, where all the first application layer measurement configurations include the first application layer measurement configuration.

In this way, the second request information may support various suspension manners, to support more refined management of the air interface load of the node. A specific suspension manner may be defined based on a protocol, or may be determined based on a system requirement. This is not limited herein.

According to the first aspect or the first to the fourth possible implementations of the first aspect, in a fifth possible implementation of the first aspect, the at least one first application layer measurement configuration for which the second request information requests to suspend measurement result reporting is determined by the first node based on one or any combination of the second identifier of the at least one first application layer measurement configuration included in the first request information, the service type, the measurement priority, or the visibility indicator; or is determined by the first node based on the first request information and other information other than the first request information, where the other information includes one or any combination of the service type, the measurement priority, or the visibility indicator.

In this way, the at least one first application layer measurement configuration for which measurement result reporting needs to be suspended may be determined by the second node, or may be determined by the first node. A specific manner to be used may be predefined in a protocol, or may be set based on a system requirement. This is not limited herein.

According to the first aspect or the first to the fifth possible implementations of the first aspect, in a sixth possible implementation of the first aspect, that the second request information requests the terminal device to suspend reporting, to the second node, the measurement results includes:

the second request information requests the terminal device to report the measurement results to the first node.

In this way, the terminal device may report, to the first node by using the second request information, the measurement results corresponding to the first application layer measurement configurations, so that overheads of notification signaling can be reduced.

According to the first aspect or the second possible implementation of the first aspect, in a seventh possible implementation of the first aspect, the third request information may meet one of the following:

the third request information includes one or any combination of all or some second identifiers in the at least one first application layer measurement configuration, a corresponding service type, a corresponding measurement priority, or a corresponding visibility indicator; or the third request information requests to resume reporting a measurement result corresponding to a non-specific first application layer measurement configuration in the first application layer measurement configurations for which measurement result reporting to the second node is suspended, or the third request information requests to resume reporting the measurement results that correspond to all the first application layer measurement configurations and that are suspended from reporting to the second node, or the third request information includes a resume quantity indication for indicating a quantity of first application layer measurement configurations for which measurement result reporting to the second node is requested to be resumed.

In this way, the third request information may support various resumption manners, to support more refined management of the air interface load of the nodes. A specific resumption manner may be defined based on a protocol, or may be determined based on a system requirement. This is not limited herein.

Similarly, the fourth request information meets one of the following:

the fourth request information includes one or any combination of first identifiers of all or some first application layer measurement configurations in the at least one first application layer measurement configuration, a corresponding service type, a corresponding measurement priority, or a corresponding visibility indicator; or the fourth request information requests to resume reporting, to the second node, the measurement results corresponding to all the first application layer measurement configurations sent by the first node to the terminal device, where all the first application layer measurement configurations include the at least one first application layer measurement configuration; or the fourth request information requests to resume reporting the measurement results that correspond to all the application layer measurement configurations and that are suspended from reporting to the second node.

In other words, all the application layer measurement configurations include both the application layer measurement configuration delivered by the first node and the application layer measurement configuration delivered by the second node.

In this way, the fourth request information may support various resumption manners, to support more refined management of the air interface load of the nodes. A specific resumption manner may be defined based on a protocol, or may be determined based on a system requirement. This is not limited herein.

The at least one first application layer measurement configuration for which measurement result reporting needs to be suspended may be determined by the second node, or may be determined by the first node. Similarly, all or some first application layer measurement configurations in the at least one first application layer measurement configuration for which the fourth request information requests to resume measurement result reporting are determined based on one or any combination of all or some second identifiers in the at least one first application layer measurement configuration that is included in the third request information, the service type, the measurement priority, or the visibility indicator; or is determined by the first node based on the first request information and other information other than the first request information, where the other information includes one or any combination of the service type, the measurement priority, or the visibility indicator. Specifically, whether the at least one first application layer measurement configuration is determined by the second node or the first node may be predefined in a protocol, or may be set based on a system requirement. This is not limited herein.

According to the first aspect or the foregoing possible implementations of the first aspect, the first node may further send related information about the first application layer measurement configuration to the second node, where the related information includes one or any combination of the following:

the service type, the measurement priority, the second identifier of the first application layer measurement configuration, and the visibility indicator.

In this way, the second node may provide, in the first request information and/or the third request information, a range of the involved first application layer measurement configurations, or identify, when receiving a measurement result reported by UE, an application layer measurement configuration corresponding to the measurement result.

According to the first aspect or the foregoing possible implementations of the first aspect, the first node may send, to the second node, a correspondence between an RRC layer identifier of the first application layer measurement configuration and a global identifier of the first application layer measurement configuration.

In this way, the second node may provide, in the first request information and/or the third request information, a range of the involved first application layer measurement configurations, or identify, when receiving a measurement result reported by UE, an application layer measurement configuration corresponding to the measurement result.

According to a second aspect of this application, an application layer measurement collection method is further provided. The method is described from a perspective of a second node, and may include:

sending, by a second node, first request information to a first node or a terminal device, where the first request information requests to suspend reporting, to the second node, measurement results corresponding to all or some of first application layer measurement configurations sent by the first node to the terminal device.

That the second node sends the first request information to the first node may correspond to that the first node receives the first request information from the second node in the first aspect.

That the second node sends the first request information to the terminal device is another application layer measurement collection method provided in this application. In the method, the second node does not send the first request information to the terminal device by using the first node, but directly sends the first request information to the terminal device. In this way, the application layer measurement configuration for which measurement result reporting needs to be suspended is determined by the second node, so that a speed of air interface load balancing can be faster.

A specific suspension manner or a resumption manner of the method is similar to that in the first aspect, and effects that can be achieved by various possible implementations are also similar. For details, refer to descriptions in the first aspect. The following provides only various possible implementations, and corresponding effects are not described again.

Further, the method may further include:

receiving, by the second node from the terminal device, measurement results corresponding to one or more first application layer measurement configurations, where the one or more first application layer measurement configurations do not belong to application layer measurement configurations sent by the first node to the terminal device.

Optionally, the measurement result includes one or any combination of an identifier of the first application layer measurement configuration, a measurement priority, a service type, a visibility indicator, or the like.

Similar to the descriptions in the first aspect, in a first possible implementation of the second aspect, the first request information meets one of the following:

the first request information includes one or any combination of the identifier of the first application layer measurement configuration for which measurement result reporting is requested to be suspended, the service type, the measurement priority, the visibility indicator, or the like;

the first request information requests to suspend reporting a measurement result corresponding to a non-specific first application layer measurement configuration;

the first request information requests to suspend reporting, to the second node, the measurement results corresponding to all the first application layer measurement configurations; or the first request information includes a suspend quantity indication for indicating a quantity of first application layer measurement configurations for which measurement result reporting is requested to be suspended.

According to the second aspect or the first possible implementation of the second aspect, in a second possible implementation of the second aspect, the method may further include:

sending, by the second node, third request information to the first node or the terminal device, where the third request information requests to resume reporting, to the second node, the measurement results that correspond to all or some of the first application layer measurement configurations and that are suspended from reporting to the second node.

Optionally, the third request information meets one of the following:
- the third request information includes one or any combination of an identifier of the first application layer measurement configuration, a service type, a measurement priority, a visibility indicator, or the like;
- the third request information requests to resume reporting, to the second node, a measurement result corresponding to a non-specific first application layer measurement configuration in the first application layer measurement configurations;
- the third request information requests to resume reporting the measurement results that correspond to all the first application layer measurement configurations and that are suspended from reporting to the second node; or
- the third request information includes a resume quantity indication for indicating a quantity of measurement results that are requested to be resumed for reporting, and the measurement results that are requested to be resumed for reporting correspond to the application layer measurement configurations sent by the first node to the terminal device.

According to the second aspect or the first or second possible implementation of the second aspect, in a third possible implementation of the second aspect, the method further includes:
- receiving, by the second node, related information about the first application layer measurement configuration from the first node, where the related information includes one or any combination of the following:
- the service type, the measurement priority, the identifier of the first application layer measurement configuration, and the visibility indicator.

According to a third aspect of this application, an application layer measurement collection method is further provided. The method is described from a perspective of a terminal device, and may include:
- receiving, by a terminal device, at least one first application layer measurement configuration from a first node;
- receiving, by the terminal device from the first node, a notification in which a measurement result corresponding to the at least one first application layer measurement configuration is reported to a second node; and
- receiving, by the terminal device, first request information from the first node or the second node, where the first request information requests to suspend reporting, to the second node, measurement results corresponding to all or some of the first application layer measurement configurations sent by the first node to the terminal device.

A specific suspension manner or a resumption manner of the method is similar to that in the first aspect or the second aspect, and effects that can be achieved by various possible implementations are also similar. For details, refer to descriptions in the first aspect or the second aspect. The following provides only various possible implementations, and corresponding effects are not described again.

According to the third aspect, in a first possible implementation of the third aspect, the method further includes:
- receiving, by the terminal device, second request information from the first node or the second node, where the second request information requests to resume reporting, to the second node, the measurement results that correspond to all or some of the first application layer measurement configurations and that are suspended from reporting to the second node.

Optionally, the receiving, from the first node, a notification in which a measurement result corresponding to the first application layer measurement configuration is reported to a second node includes:
- receiving first indication information from the first node, where the first indication information indicates to report, to the second node, the measurement result corresponding to the first application layer measurement configuration, and the first indication information includes an identifier of the first application layer measurement configuration; or
- receiving first indication information from the first node, where the first indication information indicates to report, to the second node, measurement results corresponding to all application layer measurement configurations received from the first node, and all the application layer measurement configurations include the first application layer measurement configuration.

Optionally, the first request information meets one of the following:
- the first request information includes an identifier of the first application layer measurement configuration; or
- the first request information requests the terminal device to suspend reporting, to the second node, the measurement results corresponding to all the first application layer measurement configurations received from the first node.

Optionally, the second request information is similar to the first request information, and meets one of the following:
- the second request information includes an identifier of the first application layer measurement configuration; or
- the second request information requests the terminal device to resume reporting, to the second node, the measurement results corresponding to all the first application layer measurement configurations received from the first node.

Optionally, the method further includes:
- sending, by an RRC layer of the terminal device, a suspension indication to an upper-layer protocol layer of the RRC layer of the terminal device based on the received first request information, where the suspension indication includes the identifier of the first application layer measurement configuration; and
- storing, by the upper-layer protocol layer of the RRC layer of the terminal device based on the suspension indication, the measurement result corresponding to the first application layer measurement configuration.

It may be understood that the identifier of the first application layer measurement configuration included in the first request information and/or the second request information may be replaced with the service type, the measurement priority, or the visibility indicator corresponding to the first application layer measurement configuration, or replaced with a combination of the identifier, the service type, the measurement priority, and the visibility indicator. In this way, more refined air interface load balancing can be implemented.

According to a fourth aspect, an embodiment of this application provides a communication apparatus, configured to perform the method according to any one of the first aspect to the third aspect or any one of the possible implementations of the first aspect to the third aspect. Specifically, the apparatus includes units or modules configured to perform the method according to any one of the first aspect to the third aspect or any one of the possible implementations of the first aspect to the third aspect.

According to a fifth aspect, an embodiment of this application provides a communication apparatus, including a processor and a transceiver. Optionally, a memory may be further included. The memory is configured to store instructions, and the processor is configured to execute the instructions stored in the memory. When the processor executes the instructions stored in the memory, the processor is enabled to perform the method according to any one of the first aspect to the third aspect or any one of the possible implementations of the first aspect to the third aspect.

According to a sixth aspect, a communication chip is provided, including a processor and a communication interface. The processor is configured to execute instructions, and when the processor executes the instructions, the method according to any one of the first aspect to the third aspect or any one of the possible implementations of the first aspect to the third aspect is implemented.

Optionally, the communication chip may further include a memory. The memory stores instructions. The processor is configured to execute the instructions stored in the memory or other instructions. When the instructions are executed, the processor is configured to implement the method according to any one of the first aspect to the third aspect or any one of the possible implementations of the first aspect to the third aspect.

According to a seventh aspect, an embodiment of this application provides a computer-readable medium, configured to store a computer program. The computer program includes instructions for performing the method according to any one of the first aspect to the third aspect or any one of the possible implementations of the first aspect to the third aspect.

According to an eighth aspect, an embodiment of this application further provides a computer program product including instructions. When the computer program product is run on a computer, the computer is enabled to perform the method according to any one of the first aspect to the third aspect or any one of the possible implementations of the first aspect to the third aspect.

According to a ninth aspect, a communication system is provided. The communication system includes one or more of the following:
an access network device that implements the method according to the first aspect and the functions in the possible designs, an apparatus that implements the method according to the second aspect and the functions in the possible designs, and an apparatus that implements the method according to the third aspect and the functions in the possible designs.

DETAILED DESCRIPTION OF ILLUSTRATIVE EMBODIMENTS

Figure 1:
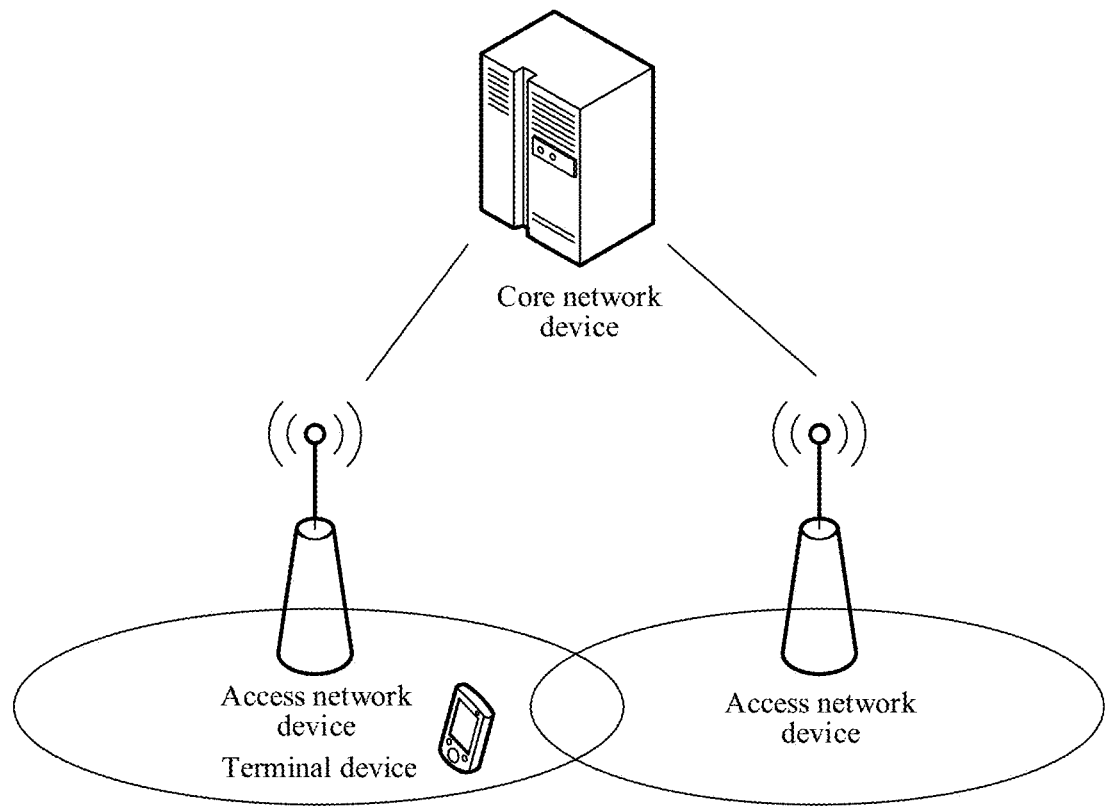
FIG. 1 is a diagram of a structure of a communication system according to this application.

The following describes technical solutions of this application with reference to accompanying drawings.

The technical solutions in embodiments of this application may be applied to various communication systems, for example, a long-term evolution (LTE) system, an LTE frequency division duplex (FDD) system, an LTE time division duplex (TDD) system, a universal mobile telecommunications system (UMTS), a 5th generation (5G) system, a new radio (NR) system, a future next generation communication system, or the like.

A terminal device in embodiments of this application may also be referred to as user equipment (UE), a mobile station (MS), a mobile terminal (MT), an access terminal, a subscriber unit, a subscriber station, a mobile console, a remote station, a remote terminal, a mobile device, a user terminal, a terminal, a wireless communication device, a user agent, a user apparatus, or the like.

The terminal device may be a device that provides voice/data connectivity for a user, for example, a hand-held device or an in-vehicle device with a wireless connection function. Currently, some examples of the terminal are: a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in a remote medical surgery, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a hand-held device with a wireless communication function, a computing device or another processing device connected to a wireless modem, an in-vehicle device, a wearable device, a terminal device in a future 5G network, a terminal device in a future evolved public land mobile network (PLMN), and the like. This is not limited in embodiments of this application.

By way of example, and not limitation, in embodiments of this application, the terminal device may alternatively be a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement complete or a part of functions without depending on smartphones, such as smart watches or smart glasses, and devices that are dedicated to only one type of application function and need to work with other devices such as smartphones, for example, various smart bands or smart jewelry for monitoring physical signs.

In addition, in embodiments of this application, the terminal device may alternatively be a terminal device in an internet of things (IoT) system. IoT is an important part of future development of information technologies. A main technical feature of the IoT is connecting a thing to a network by using a communication technology, to implement an intelligent network for interconnection between a person and a machine or between things.

In embodiments of this application, the IoT technology may implement mass connection, deep coverage, and terminal power saving by using, for example, a narrowband (NB) technology. For example, the NB includes only one resource block (RB). In other words, a bandwidth of the NB is only 180 KB. To implement massive access, terminals need to be discrete in access. According to a communication method in embodiments of this application, a congestion problem that occurs in the IoT technology when massive terminals access a network through the NB can be effectively resolved.

An access network device in embodiments of this application may be a device configured to communicate with a terminal device. The access network device may also be referred to as an access device or a radio access network device, and may be an evolved NodeB (eNB, or eNodeB) in an LTE system, or a radio controller in a cloud radio access network (CRAN) scenario. Alternatively, the access network device may be a relay station, an access point, an in-vehicle device, a wearable device, an access network device in a 5G network, an access network in a future evolved PLMN network, an access point (AP) in a WLAN, a gNB in a new radio system (new radio, NR) system, or the like. This is not limited in embodiments of this application.

In addition, in embodiments of this application, the access network device is a device in an access network (radio access network, RAN), or in other words, a RAN node that connects a terminal device to a wireless network. For example, by way of example, and not limitation, examples of the access network device are: a gNB, a transmission reception point (TRP), an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), or a wireless fidelity (Wi-Fi) access point (AP), or the like. In a network structure, the access network device may be a RAN device including a central unit (CU) node and a distributed unit (DU) node, or a RAN device including a CU control plane node (CU-CP node), a CU user plane node (CU-UP node), and a DU node.

The access network device provides a service for a cell. The terminal device communicates with the access network device by using a transmission resource (for example, a frequency-domain resource or a spectrum resource) used by the cell. The cell may be a cell corresponding to the access network device (for example, a base station). The cell may correspond to a macro base station, or may correspond to a base station corresponding to a small cell. The small cell herein may include a metro cell, a micro cell, a pico cell, a femto cell, and the like. The small cells have characteristics of small coverage and low transmit power, and are applicable to providing a high-rate data transmission service.

In addition, a plurality of cells may simultaneously operate in a same frequency band on a carrier in the LTE system or the 5G system. In some special scenarios, it may also be considered that a concept of the carrier is equivalent to that of the cell. For example, in a carrier aggregation (CA) scenario, when a secondary component carrier is configured for UE, both a carrier index of the secondary component carrier and a cell identity (Cell ID) of a secondary cell operating on the secondary component carrier are carried. In this case, it may be considered that a concept of the carrier is equivalent to that of the cell. For example, a terminal device accesses a carrier is equivalent to that a terminal device accesses a cell.

In embodiments of this application, a core network device may be a device in a core network (CN) that provides service support for a terminal device. Currently, some examples of the core network device are: an access and mobility management function (AMF) entity, a session management function (SMF) entity, a user plane function (UPF) entity, or the like. The examples are not listed one by one herein. For example, the AMF entity may be responsible for access management and mobility management of a terminal, the SMF entity may be responsible for session management, for example, user session establishment, and the UPF entity may be a functional entity on a user plane, and is mainly responsible for connecting to an external network.

It should be noted that, the entity in this application may also be referred to as a network element or a functional entity. For example, the AMF entity may also be referred to as an AMF network element or an AMF functional entity. For another example, the SMF entity may also be referred to as an SMF network element, an SMF functional entity, or the like.

FIG. 1 is a diagram of a network architecture according to an embodiment of this application. As shown in FIG. 1, a terminal device may simultaneously have communication connections to two access network devices, and may send and receive data. The connectivity may be referred to as dual-connectivity (DC) or multi-radio dual connectivity (MR-DC). In this way, a network side may provide a communication service for the terminal device by using resources of the two access network devices, to provide high-rate transmission for the terminal device. One of the two access network devices may be responsible for exchanging a radio resource control message with the terminal device and interacting with a core network control plane entity. In this case, the access network device may be referred to as a master node (MN), and the other radio access network device may be referred to as a secondary node (SN).

In the MR-DC, alternatively, the terminal device may simultaneously have communication connections to a plurality of access network devices, and may send and receive data. In the plurality of access network devices, one access network device may be responsible for exchanging a radio resource control message with the terminal device and interacting with a core network control plane entity. In this case, the access network device may be referred to as an MN, and other access network devices may be referred to as SNs.

In this embodiment of this application, the two or more access network devices may be access network devices that use a same radio access technology (RAT), for example, both are 4G base stations, or both are 5G base stations, or may be access network devices that use different RATs, for example, one is a 4G base station, and the other is a 5G base station.

The MR-DC may include a plurality of types, for example, dual connectivity formed by evolved-universal terrestrial radio access and new radio (E-UTRA-NR dual connectivity, EN-DC), dual connectivity formed by evolved universal-terrestrial radio access and new radio of a next generation radio access network (NG-RAN E-UTRA-NR dual connectivity, NGEN-DC), dual connectivity formed by new radio and evolved universal-terrestrial radio access (NR-E-UTRA dual connectivity, NE-DC), and dual connectivity formed by new radio and new radio (NR-NR dual connectivity, NR-DC). It may be understood that the MR-DC is a networking structure of a next generation radio network, and a next generation radio access network (NG-RAN) node may include a new radio (NR) access network device and an evolved universal-terrestrial radio access (E-UTRA) access network device.

For example, in the EN-DC, the MN is an LTE base station (for example, an eNB) connected to an evolved packet core (EPC), and the SN is an NR base station (for example, a gNB).

For example, in the NGEN-DC, the MN is an LTE base station (for example, a ng-eNB) connected to a 5G core network (5th generation core, 5GC), and the SN is an NR base station (for example, a gNB).

For example, in the NE-DC, the MN is an NR base station (for example, a gNB) connected to a 5GC, and the SN is an LTE base station (for example, an eNB).

For example, in the NR-DC, the MN is an NR base station (for example, a gNB) connected to a 5GC, and the SN is an NR base station (for example, a gNB).

For a terminal device in the MR-DC, there may be a user plane connection between the SN and a core network connected to the MN, that is, the core network may directly send data to the terminal device by using the SN.

In the MR-DC, there is a primary cell in the MN, and there is a primary secondary cell in the SN. The primary cell is a cell that is deployed at a dominant frequency and in which a terminal device initiates an initial connection establishment process or a connection reestablishment process, or a cell indicated as a primary cell in a handover process. The primary secondary cell is a cell in which a terminal device initiates a random access procedure in the SN, or a cell in which a terminal device skips a random access procedure in an SN change process and initiates data transmission, or a cell in which a terminal device initiates random access in a synchronous reconfiguration process.

The EN-DC network is sometimes referred to as a non-standalone (NSA) network. In an early stage of 5G, a terminal device in the EN-DC network cannot camp on an NR cell. An NR base station that can camp on the terminal device is sometimes referred to as a standalone (SA) NR base station.

Figure 2:
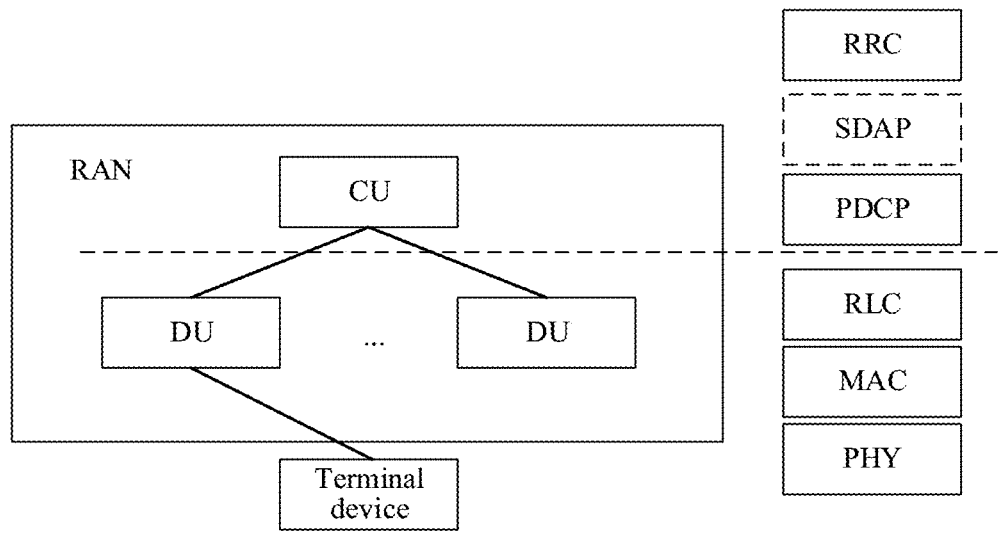
FIG. 2 is a diagram of a structure of an access network device according to this application.

FIG. 2 is a diagram of a network architecture according to an embodiment of this application. As shown in FIG. 2, communication between a RAN device and a terminal device complies with a specific protocol layer structure. For example, a control plane protocol layer structure may include functions of protocol layers such as a radio resource control (RRC) layer, a packet data convergence protocol (PDCP) layer, a radio link control (RLC) layer, a media access control (MAC) layer, and a physical layer. A user plane protocol layer structure may include functions of protocol layers such as a PDCP layer, an RLC layer, a MAC layer, and a physical layer. In an implementation, a service data adaptation protocol (SDAP) layer may be further included above the PDCP layer of the user plane protocol layer structure.

The functions of the protocol layers may be implemented by using one node, or may be implemented by using a plurality of nodes. For example, in an evolved structure, the RAN device may include a central unit (CU) and a distributed unit (DU), and a plurality of DUs may be controlled by one CU in a centralized manner.

As shown in FIG. 2, for the CU and the DU, division may be performed based on a protocol layer of a radio network.

For example, functions of the PDCP layer and a protocol layer above the PDCP layer are set on the CU, and functions of protocol layers below the PDCP layer, such as the RLC layer and the MAC layer, are set on the DU. In other words, the CU has functions of layers (including the PDCP layer, the RRC layer, and the SDAP layer) above the PDCP layer, and the DU has functions of layers (including the RLC layer, the MAC layer, and the PHY layer) below the PDCP layer.

The division at such protocol layers is merely an example. The division may also be performed at other protocol layers such as the RLC layer, so that functions of the RLC layer and protocol layers above the RLC layer are set on the CU and functions of protocol layers below the RLC layer are set on the DU. Alternatively, the division is performed within a specific protocol layer. For example, some functions of the RLC layer and functions of protocol layers above the RLC layer are set on the CU, and remaining functions of the RLC layer and functions of protocol layers below the RLC layer are set on the DU. In addition, division may alternatively be performed in another manner. For example, division is performed based on a latency. A function requiring processing time to satisfy a latency requirement is set on the DU, and a function requiring processing time not to satisfy the latency requirement is set on the CU.

Figure 3:
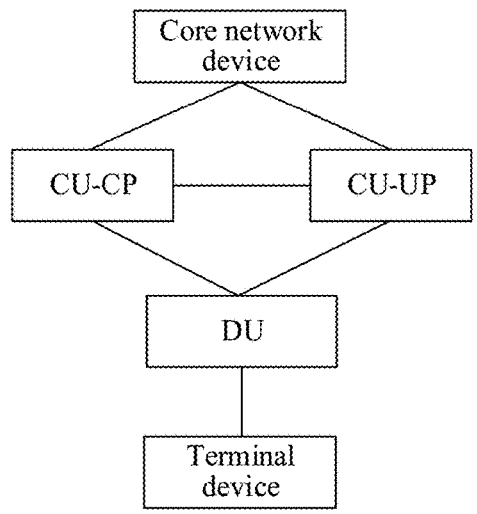
FIG. 3 is a diagram of another structure of an access network device according to this application.

FIG. 3 is another diagram of a network architecture to which an embodiment of this application is applicable. Compared with the architecture shown in FIG. 2, a control plane (CP) and a user plane (UP) of the CU may be further separated and implemented by different entities, which are respectively a CU control plane entity (CU-CP entity) and a CU user plane entity (CU-UP entity).

In the foregoing network architecture, signaling generated by the CU may be sent to a terminal device through the DU, or signaling generated by a terminal device may be sent to the CU through the DU. The DU may transparently transmit the signaling to the terminal device or the CU by directly packaging the signaling at a protocol layer without parsing the signaling. In the following embodiments, if transmission of such signaling between the DU and the terminal device is involved, sending or receiving of the signaling by the DU includes this scenario. For example, signaling at the RRC or PDCP layer is eventually processed as signaling at the PHY layer and the signaling is then sent to the terminal device, or is converted from received signaling at the PHY layer. In the architecture, the signaling at the RRC layer or the PDCP layer may also be considered to be sent by the DU, or sent by the DU and a radio frequency.

In the foregoing embodiment, the CU is classified into a network device on a RAN side. In addition, the CU may be alternatively classified into a network device on a CN side. This is not limited herein.

In the following embodiments, an example in which the terminal device is UE is used for descriptions. It may be understood that the UE in embodiments may be replaced with any other terminal device. This is not limited herein.

For some streaming services or voice services, for example, a streaming service and a multimedia telephony service for an internet protocol multimedia subsystem (MTSI), signal quality alone cannot reflect user experience in using the services. An operator wants to learn of user experience, to better optimize a network and improve user experience. This type of measurement collection is referred to as QoE measurement collection, or application layer measurement collection (application layer measurement for short). Signaling-based QoE measurement and management-based QoE measurement may be performed by using a trace procedure or another procedure. The signaling-based QoE measurement means that the QoE measurement is specific to specific UE. For example, a core network sends signaling-based QoE measurement configuration information to a base station by using UE-associated signaling. The management-based QoE measurement means that the QoE measurement is not specific to specific UE. For example, operations, administration and maintenance or OAM sends management-based QoE measurement configuration information to a base station, and the base station selects, based on capabilities of UEs currently accessing the base station and other information, a part of UEs to perform QoE measurement.

Figure 4:
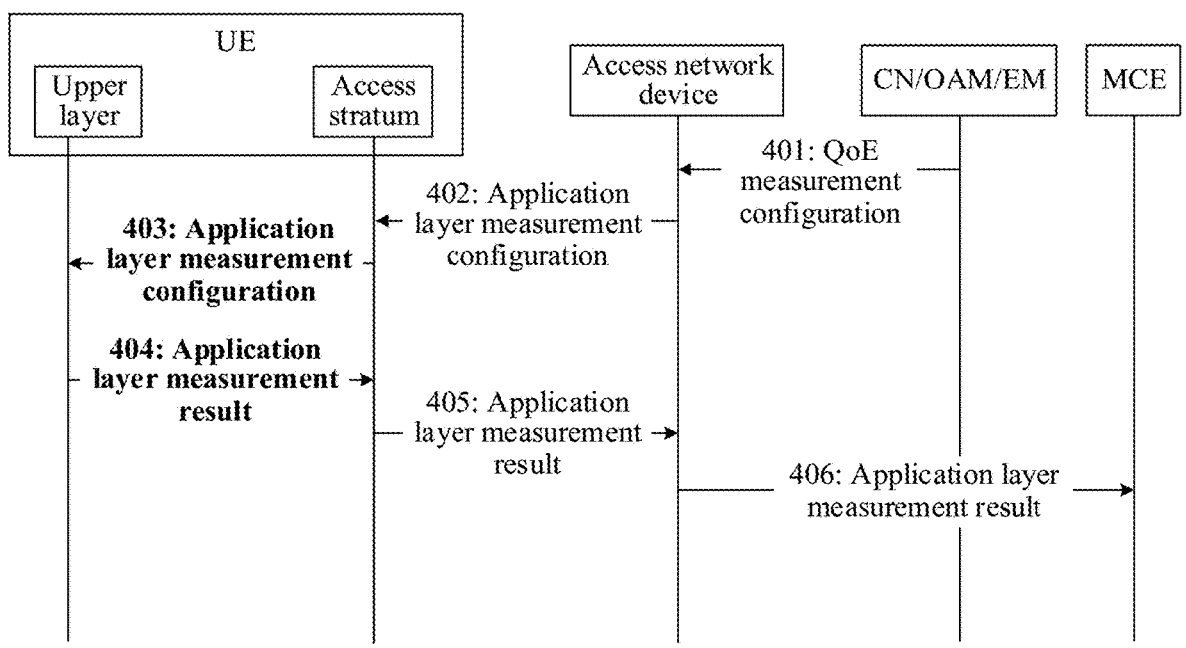
FIG. 4 is a schematic flowchart of a basic procedure of QoE measurement according to this application.

As shown in FIG. 4, a basic procedure of QoE measurement may include the following steps.

401: An access network side obtains QoE measurement configuration information from one or any combination of a CN, OAM, or an element manager (EM).

The QoE measurement configuration information indicates UE to perform application layer QoE measurement, for example, indicate UE to start application layer QoE measurement.

In some implementations, when the QoE measurement is signaling-based QoE measurement, the CN sends the QoE measurement configuration information to the access network side. Correspondingly, the access network side receives the QoE measurement configuration information from the CN. In a possible implementation, the CN may notify the QoE measurement configuration information specific to specific UE. For example, the CN may send the QoE measurement configuration information by using an interface message that is for the specific UE and that is between the access network side and the CN. For example, the QoE measurement configuration information is carried in one or any combination of an initial context setup message, a trace start message, a handover request message, or a UE context modification request message sent by the CN to the access network side for the specific UE.

In some implementations, when the QoE measurement is management-based QoE measurement, the OAM or the EM sends the QoE measurement configuration information to the access network side. Correspondingly, the access network side receives the QoE measurement configuration information from the OAM or the EM. It should be noted that, the QoE measurement configuration information herein is not QoE measurement configuration information specific to specific UE. In other words, when the access network side receives the QoE measurement configuration information from the OAM or the EM, the QoE measurement configuration information is not specific to specific UE for measurement.

In an example, the QoE measurement configuration information may include one or any combination of a plurality of pieces of information shown in the following table. The QoE measurement configuration information includes a container, and the container includes an application layer measurement configuration. The reason why the information is referred to as a container (also referred to as a transparent container) is that the access network side does not need to parse content in the container, but only needs to transparently transmit the content.

TABLE 1

| IE/Group name (information element/group name) | Presence | Range | IE type and reference (information element type and reference) | Semantics descriptions | Criticality | Assigned criticality |
|---|---|---|---|---|---|---|
| Container for application layer measurement configuration | M Mandatory | | Octet string (8-bit string) (1 . . . 1000) | Indicates application layer measurement configuration | — | — |
| CHOICE Area scope of QMC (scope of QoE measurement collection) | M | | | | — | — |
| >Cell based (cell-based) | | | | | — | |
| >>Cell ID list for QMC (cell ID list for QoE measurement collection) | | 1 . . . <maxnoofCellIDforQMC> (1 . . . < maximum number of cell IDs for QMC>) | | | — | |
| >>>NG-RAN cell global identifier | M | | | Cell global identifier corresponding to an NR or E-UTRA radio access technology over an air interface. For details, refer to section 9.3.1.73 in TS 38.413. | — | — |

TABLE 1-continued

QoE measurement configuration information

| IE/Group name (information element/group name) | Presence | Range | IE type and reference (information element type and reference) | Semantics descriptions | Criticality | Assigned criticality |
|---|---|---|---|---|---|---|
| >TA based (tracing area-based) | | | | | | — |
| >>TA list for QMC | | 1 . . . <maxnoofTAforQMC> (1 . . . <maximum number of TAs for QMC>) | | | | — |
| >>>TAC (tracking area code) | M | | 3-byte bit stream OCTET STRING (SIZE(3)) | The TAI is derived using the current serving PLMN (TAI is obtained based on a current serving PLMN) | — | — |
| >TAI based (tracking area identity-based) | | | | | — | — |
| >>TAI list for QMC (tracking area identity list for QMC) | | 1 . . . <maxnoofTAforQMC> (1 . . . <maximum number of TAs for QMC>) | | | — | — |
| >>>TAI | M | | Includes a PLMN identity and a TAC. For details, refer to section 9.3.3.11 in TS 38.413. | | — | — |
| >PLMN area based (based on a public land mobile network) | | | | | | — |
| >>PLMN list for QMC | | 1 . . . <maxnoofPLMNforQMC> | | | | — |
| >>>PLMN identity | M | | 3-byte bit stream OCTET STRING (SIZE(3)). For details, refer to section 9.3.3.5 in TS 38.413. | | — | — |
| Service type (service type) | M | | ENUMERATED (streaming service, MTSI service, VR service . . . ) Enumerated (streaming service, MTSI service, VR service . . . ) | This IE indicates the service type of UE application layer measurement (The information element indicates a service type of UE application layer measurement) | — | — |

(1 . . . 1000) indicates a value range of an 8-bit string.

In Table 1, the area scope of QoE measurement collection may be a cell-based QoE measurement collection area range, a TA-based QoE measurement collection area range, a TAI-based QoE measurement collection area range, and a PLMN area-based QoE measurement collection area range, respectively. The cell-based QoE measurement collection area range may carry a cell list for QMC, where <maxnoofCellIDforQMC> indicates that there may be a plurality of cell lists, and each cell list includes a global cell identifier (that is, content in a next row thereof). The TA-based QoE measurement collection area range may carry a TA list for QMC, where <maxnoofTAforQMC> indicates that there may be a plurality of TA lists, and each TA list includes a TAC (that is, content in a next row thereof). The TAI-based QoE measurement collection area range may carry a TAI list for QMC, where <maxnoofTAforQMC> indicates that there may be a plurality of TAI lists, and each TAI list includes a TAI (that is, content in a next row thereof). The PLMN area-based QoE measurement collection area range may carry a PLMN list for QMC, where <maxnoofPLMN-forQMC> indicates that there may be a plurality of PLMN lists, and each PLMN list includes a PLMN identity (that is, content in a next row thereof).

When the QoE measurement configuration information includes the area scope of QoE measurement in Table 1, only when the UE is located in the areas, the access network side delivers the QoE measurement configuration information to the UE, or the access network side requests the UE to report a QoE measurement result, or the access network side requests the UE to perform QoE measurement.

It should be noted that, in Table 1, the container for application layer measurement configuration in the QoE measurement configuration information may be transparent to the access network side. That is, the access network side does not need to perceive information and content included in the container for application layer measurement configuration. The information included in the container for application layer measurement configuration may be referred to as application layer measurement configuration information (or an application layer measurement configuration). In another implementation, the container for application layer measurement configuration may also carry information and content included in the container for application layer measurement configuration in a form that can be perceived by the access network side. This is not limited in this application.

Optionally, the QoE measurement configuration information may include one or more pieces of content in Table 1. For example, the QoE measurement configuration information may include application layer measurement configuration information respectively corresponding to a plurality of service types and/or QoE measurement collection ranges respectively corresponding to a plurality of service types.

It should be noted that, in this embodiment, that the CN, the OAM, or the EM sends a QoE measurement request to the access network device is used as an example. Alternatively, another network device may send a QoE measurement request to the access network device, or the access network device may trigger QoE measurement based on a requirement of the access network device. This is not limited in this application.

For management-based QoE measurement, the access network side obtains the QoE measurement configuration information from the OAM or the element manager (EM). The QoE measurement configuration information includes an application layer measurement configuration. For example, the QoE measurement configuration information includes a container, and the container includes the application layer measurement configuration. In this case, the QoE measurement configuration information notified by the OAM or the EM is not specific to specific UE. The QoE measurement configuration information may further include some information related to application layer measurement configuration, for example, information indicating a service type to which the application layer measurement configuration is applied, or information indicating a scope to which the application layer measurement configuration is applied, for example, one or more of information of a cell, a tracking area (TA), or a PLMN area.

In addition, one or any combination of the CN, the OAM, or the EM may further notify the access network side, where the application layer measurement configuration for the UE includes enabling the UE to report or measure the following application layer indicators, so that the access network side may learn or perceive that the UE measures the following application layer indicators. The application layer indicators may include one or any combination of the following indicators.

Average throughput: The average throughput indicates a total quantity of bits received by an application layer of UE within a measurement interval. For example, for the average throughput of a streaming service, for example, refer to a definition in section 10.2 in the 3GPP TS 26.247, but the indicator is not limited thereto.

Initial play delay: The initial play delay indicates an initial play delay when a streaming media starts to be displayed. For example, the initial play delay may be defined as a time period from a moment at which a first segment of media is obtained to a moment at which the streaming media is extracted from a buffer of a client. For details about the indicator, refer to section 10.2 in 3GPP TS 26.247, but the indicator is not limited thereto.

Buffer level: The buffer level indicates duration that media data can be played from a current play moment. For details about the indicator, refer to section 10.2 in 3GPP TS 26.247, but the indicator is not limited thereto.

Play delay: The play delay indicates a play delay in starting a streaming media. For example, the play delay may be defined as a delay from time when a dynamic adaptive streaming over hypertext transfer protocol (dynamic adaptive streaming over HTTP, DASH) player receives a play/back/start trigger to time when the media is played. For details about the indicator, refer to section 10.2 in 3GPP TS 26.247, but the indicator is not limited thereto.

Corruption duration: The corruption duration indicates an interval between Nepal time (NPT) corresponding to a previous good frame before corruption and Nepal time corresponding to a first good frame after corruption. A good frame is a frame that is received in its entirety and all parts of an image corresponding to the frame include correct content or the frame is a new frame (that is, a frame that does not depend on any previous decoded frame) or depends only on a good frame that has been previously decoded. For details about the indicator, refer to section 16.2 in 3GPP TS 26.114, but the indicator is not limited thereto.

Quantity of consecutive lost packets: The quantity of consecutive lost packets indicates a quantity of consecutive lost real-time transport protocol (RTP) packets. For details about the indicator, refer to section 16.2 in 3GPP TS 26.114, but the indicator is not limited thereto.

Jitter duration: The jitter means that a difference between an actual play moment and an expected play moment of a frame exceeds a threshold. The expected play moment of the frame is a play moment of a previous play frame plus (a difference between Nepal time of a current frame and Nepal time of a previous frame). For details about the indicator, refer to section 16.2 in 3GPP TS 26.114, but the indicator is not limited thereto.

Out-of-synchronization duration: The out-of-synchronization indicates that an absolute time difference between a value A and a value B exceeds a specific threshold. The value A is a difference between a play moment of a previous play frame of a video stream and a play moment of a previous play frame of a voice stream. The value B is a difference between an expected play moment of a previous play frame of a video stream and an expected play moment of a previous play frame of a voice stream. For details about the indicator, refer to section 16.2 in 3GPP TS 26.114, but the indicator is not limited thereto.

Round-trip delay: The round-trip delay indicates round-trip time of RTP-level round-trip time, plus an additional two-way delay due to buffering and other processing in a client. That is, the round-trip delay is a delay from the RTP level to a speaker and microphone in sequence, and then to the RTP level. For details about the indicator, refer to section 16.2 in 3GPP TS 26.114, but the indicator is not limited thereto.

Average bit rate: The average bit rate indicates a bit rate at which valid media information is encoded in a measurement periodicity. For details about the indicator, refer to section 16.2 in 3GPP TS 26.114, but the indicator is not limited thereto.

Comparable quality viewport switching latency (comparable quality viewport switching latency): The indicator reports a latency and a quality-related factor when quality deteriorates due to viewport switching. The quality-related factor includes a quality ranking value and/or resolution. For details about the indicator, refer to a protocol related to 3GPP VR, for example, TS 26.118, but the indicator is not limited thereto.

Frame freezing: The frame freezing indicates whether frame freezing occurs during video stream play or duration of frame freezing. For details, refer to a protocol related to 3GPP streaming media, for example, TS 26.247, but the indicator is not limited thereto.

In this application, perception means interpretation by an access network side, and "perception" may be replaced with another word that can express a meaning that can be interpreted by the access network side, such as being visible, learning, or detection.

Content in the 3GPP specifications and sections referenced in this application should be understood as optional implementations. Generally, the 3GPP specifications, such as TS 26.114, have a plurality of versions, for example, V15.8.0. A chapter of corresponding content referenced in this application usually remains unchanged in each standard version. Therefore, any version including the corresponding content may be used as an optional implementation of this application. This is not limited in this application.

After the access network side learns that the UE measures the application layer indicators, the access network side may notify the UE to report measurement results of the application layer indicators that can be perceived by the access network side. For example, the access network side may notify the UE to report measurement results of all or some of application layer indicators that can be perceived by the access network side. For example, the access network side explicitly indicates the UE to report specific measurement results of application layer indicators that can be perceived by the access network side, or the access network side may notify the UE to report measurement results of application layer indicators that can be perceived by the access network side as specified in a protocol. For example, the access network side does not need to notify the UE to report the measurement results of the application layer indicators that can be perceived by the access network side as specified in the protocol. If the UE currently measures the application layer indicators that can be perceived by the access network side as specified in the protocol, the UE reports the measurement results corresponding to the application layer indicators.

Optionally, the application layer measurement configuration in the QoE measurement configuration information may be sent to the access network side in a form other than a container, but may be sent to the access network side in a form that can be perceived by the access network side. In other words, the application layer measurement configuration may be sent to the access network side in a container form or in a form other than a container.

Optionally, the QoE measurement configuration information sent by one or any combination of the CN, the OAM, or the EM to the access network side may further include at least one of a QoE reference or an IP address of a measurement collection entity (MCE). The QoE reference is used to identify the QoE measurement requested by a network (or used to identify a QoE measurement collection task at a base station and a measurement collection entity). The QoE reference is a globally unique identifier, that is, a global identifier. For example, the QoE reference is formed by a PLMN and a QoE measurement collection identifier, where the PLMN is formed by a mobile country code (MCC) and a mobile network code (MNC), and the QoE measurement collection identifier may be allocated by a management system or an operator. The MCE IP address may be used by the access network side to send the measurement result to the MCE based on the MCE IP address after receiving the measurement result reported by the UE. Optionally, the measurement collection entity may also be another entity or in another name. This is not limited in this application.

402: The access network side sends the application layer measurement configuration to the UE.

For signaling-based QoE measurement, the access network side sends the application layer measurement configuration to the corresponding UE. Optionally, before sending the application layer measurement configuration, the access network side may determine, depending on whether the UE supports QoE measurement, whether to configure QoE measurement for the UE. If it is determined that the UE supports QoE measurement, the access network side sends the application layer measurement configuration to the UE.

For management-based QoE measurement, the access network side selects appropriate UE to perform QoE measurement based on the QoE measurement configuration information sent by one or any combination of the CN, the OAM, and the EM, whether the UE supports corresponding QoE measurement, and some other factors. After selecting the UE, the access network side sends the application layer measurement configuration to the selected UE.

The access network side sends the application layer measurement configuration obtained from one or any combination of the CN, the OAM, or the EM to the UE by using an RRC message, where the message may further carry a service type corresponding to the application layer measurement configuration.

In this application, step 401 is optional. The access network side may trigger the application layer measurement configuration for the UE, and this is not limited to that step 402 needs to be triggered based on step 401. In other words, the access network side may send, to the UE by using an RRC message, the application layer measurement configuration generated by the access network side. Optionally, the RRC message may further carry the service type corresponding to the application layer measurement configuration.

In addition to sending the application layer measurement configuration to the UE, the access network side may further deliver some configuration information to the UE, to notify the UE to report some application layer indicators in a form that can be perceived by the access network side, for example, in an information element form instead of a container form. The application layer indicators may include the application layer indicators that can be perceived by the access network side in the foregoing step 401, or may include a comprehensive score of the application layer indicators, a comprehensive score of access stratum indicators, or a comprehensive score obtained by combining the application layer indicators and the access layer indicators, or an indicator indicating quality of the application layer indicators. For example, a value of quality may be good, medium, or poor. For another example, the base station delivers some thresholds to the UE, and the UE learns of, based on measurement results of the application layer indicators and some thresholds corresponding to the application layer measurement indicators, indicators of quality corresponding to the measurement results of the application layer indicators. Optionally, the access network side may not need to deliver, to the UE, some configuration information about reporting application layer indicators that are perceived by the access network side. After the UE obtains the application layer indicators, the UE reports, to the access network side, some application layer indicators that are specified in a protocol and can be currently obtained by the UE.

Optionally, the application layer measurement configuration may include, in a form other than a container, configurations of the application layer indicators that can be perceived by the access network side. Further, the application layer measurement configuration may not include a configuration in a container form. In this way, the access network side may deliver the application layer measurement configuration, and does not need to receive the corresponding application layer measurement configuration from the CN, the OAM, or the EM.

Optionally, in addition to sending the application layer measurement configuration to the UE, the access network side may further deliver an application layer measurement identifier to the UE. The application layer measurement identifier may be generated by the access network side for the UE, and each application layer measurement identifier indicates an application layer measurement configuration configured by the access network side for the UE. For example, there is a correspondence between the application layer measurement identifier and the QoE reference. For example, the application layer measurement identifier may be partial information in the QoE reference, for example, including an MNC and a QoE measurement collection identifier. The access network side may pre-store the correspondence between the application layer measurement identifier and the QoE reference. The application layer measurement identifier may also be referred to as an RRC layer identifier, that is, an identifier allocated by an RRC layer on the access network side to the application layer measurement.

403: An access stratum (AS) of the UE sends the application layer measurement configuration received from the access network side to an upper layer of the AS of the UE.

For example, the upper layer of the access stratum may be, for example, an application (APP) layer, or a layer between an application layer and the access stratum. This is not limited in this embodiment of this application.

It should be noted that the access stratum of the UE is a functional layer for communication between the UE and the access network device. For example, the access stratum may include at least one of a radio resource control (RRC) layer, a packet data convergence protocol (PDCP) layer, and a service data adaptation protocol (SDAP) layer. Optionally, the access stratum may further include at least one of a radio link control (RLC) layer, a media access control (MAC) layer, and a physical PHY layer. For example, the RRC layer of the UE may receive application layer measurement configuration information and a service type, and send the application layer measurement configuration information and the service type to an upper layer of the RRC layer.

The upper layer of the AS of the UE may be an application layer, or another layer for performing QoE measurement.

The AS of the UE may send an application layer measurement configuration and a service type to the upper layer of the AS of the UE.

The upper layer of the AS of the UE performs QoE measurement based on the application layer measurement configuration.

If the application layer measurement configuration is sent to the UE in a container form, in addition to sending the application layer measurement configuration to the upper layer of the AS, the AS of the UE may further send, to the upper layer of the AS of the UE, configuration information of some application layer indicators that are received from the access network side and that are notified to the UE in a form that can be perceived by the access network side, so that the upper layer of the AS of the UE learns of specific measurement results corresponding to the configuration information of the application layer indicators that are required to be reported by the UE in a form that can be perceived by the access network side.

Optionally, the AS of the UE also sends an application layer measurement identifier corresponding to each application layer measurement configuration to the upper layer of the AS of the UE.

The AS of the UE may send the foregoing information to the upper layer of the AS by using an attention (AT) command. For example, the foregoing information may be sent to the upper layer of the AS by using a command application level measurement configuration (CAPPLEVMC) in the AT command.

404: The upper layer of the AS of the UE sends an application layer measurement result to the AS of the UE.

The upper layer of the AS of the UE reports the application layer measurement result according to a specific rule. The rule may be included, that is, configured, in an application layer measurement configuration, or pre-agreed in a protocol. For example, the rule may be that the upper layer of the AS of the UE periodically reports the application layer measurement result, or the UE may report the application layer measurement result after a session ends.

When the upper layer of the AS of the UE reports the application layer measurement result based on the application layer measurement configuration, the upper layer of the AS of the UE sends the application layer measurement result to the AS of the UE. Optionally, the upper layer of the AS of the UE may indicate a service type corresponding to the application layer measurement result.

For example, when the upper layer is an application layer, the application layer may perform application layer measurement based on the received application layer measurement configuration information, and obtain the application layer measurement result. Then, the application layer may send the application layer measurement result to the access stratum of the UE. When the upper layer is another layer for performing QoE measurement, the another layer for performing QoE measurement may perform QoE measurement based on the received QoE measurement configuration information, and obtain a QoE measurement result. Then, the upper layer may send the QoE measurement result to the access stratum of the UE. That is, the application layer measurement configuration means measurement of the application layer indicators, but is not limited to measurement at the application layer. Corresponding measurement may also be performed at another layer other than the application layer, to obtain the measurement result.

Optionally, the upper layer of the AS of the UE not only reports the application layer measurement result that is invisible to or that cannot be perceived by the access network side, but also reports a value of an application layer indicator that is visible to or that can be perceived by the access network side, that is, a measurement result or a statistical value of a measurement result of the application layer indicator, or a function value of a measurement result, for example, a value of the application layer indicator reported in a form of an information element.

Optionally, the upper layer of the AS of the UE may report only a value of application layer indicator that is visible to the access network side, for example, a value of the application layer indicator reported in a form of an information element. To be specific, the application layer measurement result exists in a reporting message only in a form other than a container.

Optionally, in addition to reporting the application layer measurement result, the upper layer of the AS of the UE may further report an application layer measurement identifier corresponding to the application layer measurement configuration corresponding to the application layer measurement result.

405: The AS of the UE sends the application layer measurement result to the access network side.

The AS of the UE sends the application layer measurement result to the access network side. Optionally, the AS of the UE further sends a service type corresponding to the application layer measurement result to the access network side.

Optionally, one or any combination of the application layer measurement result or the service type may be carried in an uplink RRC message.

Optionally, the application layer measurement result may be sent to the access network side in a container form, and/or may be sent to the access network side in a form other than a container.

Optionally, an access network device that delivers the application layer measurement configuration information, that is, an access network side device, and an access network device that receives the application layer measurement result, that is, an access network side device, may be a same access network device. Alternatively, due to movement of the UE, an access network device that delivers the application layer measurement configuration information and an access network device that receives the application layer measurement result are different access network devices.

Optionally, if the application layer measurement result is sent to the access network side in a container form, in addition to reporting an application layer measurement result that is invisible to the access network side (that is, content in the container), the AS of the UE may further report a value of an application layer indicator that is visible to the access network side. Optionally, the AS of the UE may separately report, by using different RRC messages, the application layer measurement result that is invisible to the access network side and the value of the application layer indicator that is visible to the access network side.

Optionally, in addition to reporting the application layer measurement result, the AS of the UE may further report an application layer measurement identifier corresponding to the application layer measurement configuration corresponding to the application layer measurement result.

406: The access network side sends the application layer measurement result to an MCE.

The access network side sends the application layer measurement result to the MCE. For example, the access network side may obtain a QoE reference corresponding to the application layer measurement result based on the stored correspondence between the application layer measurement identifier and the QoE reference and the application layer measurement identifier reported by the UE. The access network side then finds a corresponding MCE IP address based on the QoE reference, and sends the application layer measurement result to the MCE. Alternatively, the access network side obtains the corresponding application layer measurement configuration based on the application layer measurement identifier reported by the UE; then obtains, based on the QoE measurement configuration information delivered by the CN or the OAM, the MCE IP address corresponding to the application layer measurement result; and sends the application layer measurement result to the MCE.

Optionally, the access network side may optimize a radio resource based on an application layer indicator that is visible to the access network side and that is reported by the UE. For example, when a measurement result of an application layer indicator is not ideal, the access network side may allocate more resources to the UE, or increase a scheduling priority of the UE.

It may be understood that, in this application, considering that the access network side device may include a plurality of forms of structures, for example, DC, CU-DU separation, and the like, and considering mobility of the UE, one or more access network side devices that participate in communication with the UE may be included. For example, when a DC architecture is used, the access network side device may include an MN and an SN. When the DC architecture is further combined with the foregoing CU-DU architecture, the MN may be a CU node, a DU node, or a RAN device including the CU node and the DU node, and the SN may be a CU node, a DU node, or a RAN device including the CU node and the DU node. Therefore, the access network side devices that communicate with the UE are collectively referred to as the access network side for descriptions.

The DC may also be referred to as MR-DC, and an access network device that forms an MR-DC architecture may include a node 1 and a node 2. The node 1 is an MN, and the node 2 is an SN; or the node 1 is an SN, and the node 2 is an MN.

In an MR-DC architecture, both the MN and/or the SN may deliver application layer measurement configuration information to the UE. For example, after obtaining a measurement result based on the application layer measurement configuration information from the MN, the UE may send the measurement result to the MN, or send the measurement result to the SN based on an indication of the network side, for example, the MN. Alternatively, after obtaining a measurement result based on the application layer measurement configuration information from the SN, the UE may send the measurement result to the SN, or send the measurement result to the MN based on an indication of the network side, for example, the SN.

In a structure other than MR-DC, if load of the node 1 is high, the node 1 may send indication information to the UE, to indicate the UE to suspend QoE measurement reporting, that is, suspend reporting the QoE measurement result. Based on the indication information, the UE may continue QoE measurement but does not report the measurement result. The measurement result generated in the suspension process may be stored at the AS layer of the UE, or stored at an upper layer of the AS, for example, an application layer.

In the MR-DC, the node 1 delivers a QoE measurement configuration to the UE. Subsequently, due to load of the node 1, the node 1 may notify the UE to report a QoE measurement result by using the node 2. In all embodiments of this application, "reporting by using the node 2" may be replaced with "reporting to the node 2".

Optionally, after receiving the QoE measurement result reported by the UE, the node 2 sends the QoE measurement result received from the UE to the node 1.

Optionally, when the node 1 determines that the node 1 can process measurement results of the QoE measurement configurations, for example, after a load problem of the node 1 is resolved, the node 1 may request the node 2 to report, to the node 1 by the node 2, the QoE measurement result previously reported by the UE. Optionally, after receiving the QoE measurement result, the node 2 may forward the QoE measurement result to the CN, the OAM, or the EM.

However, after the node 1 notifies the UE to report, by using the node 2, a measurement result corresponding to the QoE measurement configuration delivered by the node 1, if load of the node 2 subsequently exceeds a specific threshold, the node 2 cannot receive or report the measurement result corresponding to the QoE measurement configuration. For this case, this application provides a method for reporting a measurement result corresponding to a QoE measurement configuration or an application layer measurement configuration, that is, an application layer measurement collection method. It may be understood that, when the node 1 learns that load of the UE in one or more serving cells of the node 2 exceeds a specific threshold, the node 1 may also initiate a procedure of suspending or resuming reporting the measurement result to the UE. The procedure is similar to a procedure of suspending or resuming reporting the measurement result initiated by the node 2. Details are not described herein again.

The following further describes in detail a communication method and a communication apparatus provided in this application with reference to accompanying drawings.

The technical solutions of this application may be applied to a wireless communication system, for example, the communication system shown in FIG. 1, the communication system shown in FIG. 2, or the communication system shown in FIG. 3. There may be a wireless communication connection relationship between communication apparatuses in the wireless communication system. One apparatus in the communication apparatuses may be, for example, a master node or a chip configured in a master node, another apparatus may be, for example, a secondary node or a chip configured in a secondary node, and another apparatus may be, for example, a terminal device or a chip configured in a terminal device. This is not limited in this embodiment of this application.

Without loss of generality, the following describes embodiments of this application in detail by using a communication process of UE as an example. It may be understood that any UE or the chip configured in the UE in the wireless communication system may perform communication based on a same method, any master node or the chip configured in the master node in the wireless communication system may perform communication based on a same method, and any secondary node or the chip configured in the secondary node in the wireless communication system may perform communication based on a same method. This is not limited in this application.

The following uses a node 1 and a node 2 as an example for descriptions. The node 1 may be an MN, and the node 2 may be an SN; or the node 1 is an SN, or the node 2 is an MN. However, this does not constitute a limitation on embodiments of this application.

Figure 5:
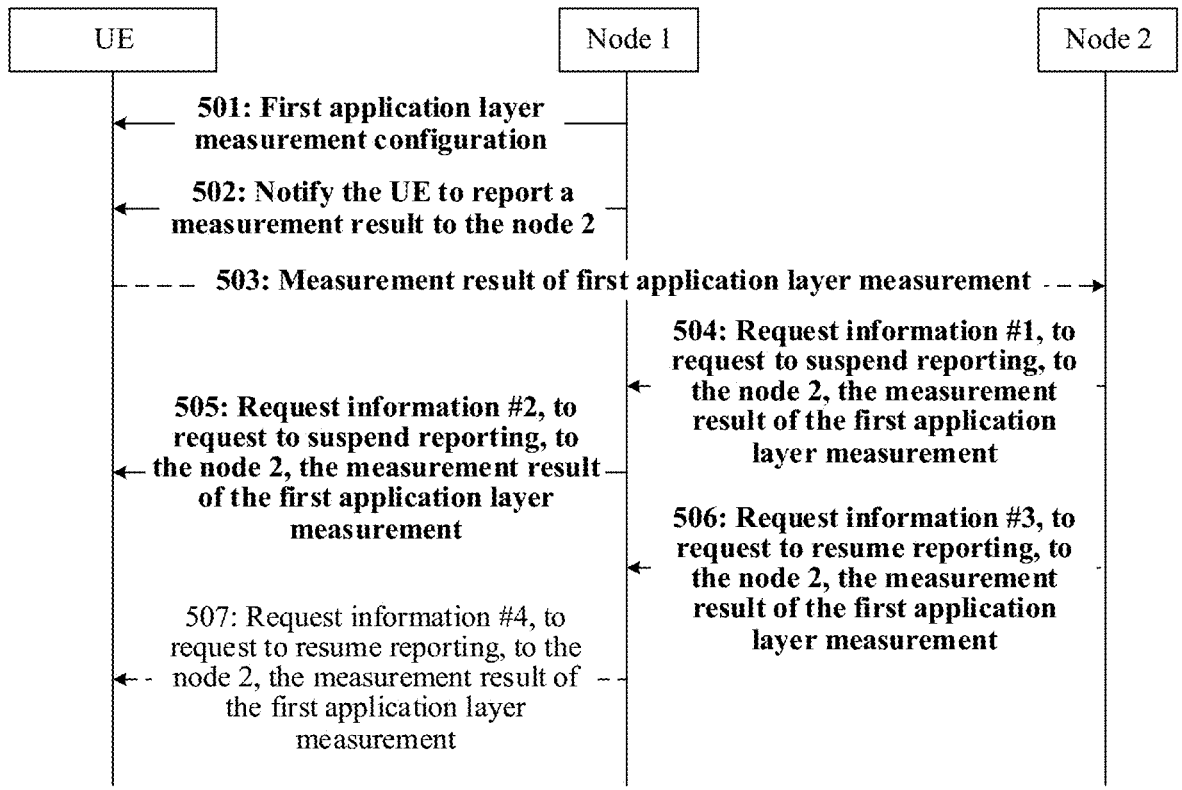
FIG. 5 is a schematic flowchart of an application layer measurement collection method according to an embodiment of this application.

As shown in FIG. 5, an application layer measurement collection method provided in an embodiment of this application includes the following steps.

501: A node 1 sends an application layer measurement configuration to UE.

The node 1 may be referred to as an application layer measurement configuration node. The node 1 may be an MN or an SN.

It may be understood that the process described in step 501 is the same as that described in step 402, and the descriptions of step 402 may be applied to step 501.

Optionally, before step 501, the method may further include step 500: A node 1 receives a QoE measurement configuration from one or any combination of a CN, OAM, or an EM. The process described in step 500 is the same as that described in step 401. For example, for the QoE measurement configuration, for example, an application layer measurement configuration, information related to the application layer measurement configuration, a transparent container form, a form other than a transparent container, or information related to perception of an access network, refer to the descriptions in embodiment shown in FIG. 4. Details are not described herein again. The information related to perception of the access network may include one or any combination of an application layer indicator that can be perceived, a notification (that is, a visibility indicator) of whether to configure an application layer indicator that can be perceived, or whether to report an application layer indicator that can be perceived in a non-perceived manner. The QoE measurement configuration may include the application layer measurement configuration and the information related to the application layer measurement configuration. The application layer measurement configuration included in the QoE measurement configuration may be carried in a transparent container form, or may be carried in a form other than a transparent container. The information related to the application layer measurement configuration may include one or any combination of an area scope, a measurement priority, a service type, or a visibility indicator.

The node 1 sends, to the UE, the application layer measurement configuration included in the QoE measurement configuration received from one or any combination of the CN, the OAM, or the EM.

The node 1 may further send all or a part of the information related to the application layer measurement configuration to the UE. For example, the node 1 sends the service type to the UE, but does not send the area scope.

Optionally, after the node 1 learns, from one or any combination of the CN, the OAM, or the EM, that the UE measures the application layer indicator, the node 1 may notify the UE to report a measurement result of the application layer indicator that can be perceived by the access network side, for example, the node 1 or the node 2. For example, the node 1 may notify the UE to report measurement results of all or some of application layer indicators that can be perceived by the access network side, or the node 1 may notify the UE to report measurement results of application layer indicators that can be perceived by the access network side as specified in a protocol. For example, if the UE currently measures the application layer indicators that can be perceived by the access network side as specified in the protocol, the UE reports measurement results corresponding to the application layer indicators.

Optionally, the application layer measurement configuration in the QoE measurement configuration information obtained by the node 1 from one or any combination of the CN, the OAM, the EM, or the like may not be in a container form, but in a form that can be perceived by the access network side, that is, in a form other than a container.

Optionally, in some possible implementations, the node 1 receives the QoE measurement configuration from the node 2. For example, the node 2 may request the node 1 to send the application layer measurement configuration in the QoE measurement configuration to the UE. In this case, that the node 1 sends the QoE measurement configuration to the UE may be that the node 2 sends the QoE measurement configuration to the UE, that is, the node 2 sends the QoE measurement configuration to the UE by using the node 1.

Optionally, in addition to sending the application layer measurement configuration to the UE, the node 1 may further deliver some configuration information to the UE, to notify the UE to report some application layer indicators in a form that can be perceived by the access network side, for example, in an information element form instead of a container form. The application layer indicators may include the application layer indicators that can be perceived by the access network side in the foregoing step 401, or may include a comprehensive score of application layer indicators, a comprehensive score of access stratum indicators, or a comprehensive score obtained by combining the application layer indicators and the access layer indicators, or an indicator indicating quality of the application layer indicators. For example, a value of quality may be good, medium, or poor. For example, the base station delivers some thresholds to the UE, and the UE learns of, based on measurement results of the application layer indicators and some thresholds corresponding to the application layer measurement indicators, indicators of quality corresponding to the measurement results of the application layer indicators. Optionally, the access network side may not need to deliver, to the UE, some configuration information about reporting application layer indicators perceived by the access network side. After the UE obtains the application layer indicators, the UE reports, to the access network side, some application layer indicators that are specified in a protocol and can be currently obtained by the UE.

Optionally, the application layer measurement configuration may include, in a form other than a container, for example, in a form of an information element, configurations of the application layer indicators that can be perceived by the access network side. Further, the application layer measurement configuration may not include a configuration in a container form. In this way, the access network side may deliver the application layer measurement configuration, and does not need to receive the corresponding application layer measurement configuration from the CN, the OAM, or the EM.

Optionally, in addition to sending the application layer measurement configuration to the UE, the access network side may further deliver an application layer measurement identifier to the UE. The application layer measurement identifier may be generated by the access network side for the UE, and each application layer measurement identifier indicates an application layer measurement configuration configured by the access network side for the UE. There is a correspondence between the application layer measurement identifier and the QoE reference. For example, the application layer measurement identifier may be partial information in the QoE reference. The access network side may pre-store the correspondence between the application layer measurement identifier and the QoE reference. The application layer measurement identifier may also be referred to as a radio resource control RRC layer identifier.

It should be noted that the UE correspondingly receives the application layer measurement configuration from the node 1.

Optionally, an access stratum of the UE sends the application layer measurement configuration to an upper layer of the access stratum. For example, the access stratum of the UE may directly send the application layer measurement configuration to the upper layer, or the access stratum of the UE may obtain information about a new application layer measurement configuration based on the application layer measurement configuration, and send the information about the new application layer measurement configuration to the upper layer. The information about the new application layer measurement configuration indicates the upper layer to perform application layer measurement.

502: The node 1 notifies the UE to report, to the node 2, a measurement result corresponding to the application layer measurement configuration delivered by the node 1.

Because the application layer measurement configuration may be referred to as a configuration of application layer measurement, a measurement result corresponding to the application layer measurement configuration may be referred to as a measurement result of the application layer measurement or a result of the application layer measurement for short.

It may be understood that, the node 1 may notify the UE to report, to the node 2, measurement results corresponding to all or some of the application layer measurement configurations delivered by the node 1.

In this embodiment of this application, the application layer measurement configurations related to a notification of the node 1 are collectively referred to as a first application layer measurement configuration, and there may be one or more first application layer measurement configurations. A measurement result corresponding to the first application layer measurement configuration may be referred to as a measurement result of the first application layer measurement or a result of the first application layer measurement.

In a first possible implementation, the node 1 may send indication information #0 to the UE, to indicate a specific measurement result or some specific measurement results of the application layer measurement that are reported by using the node 2. For example, the indication information #0 may include one or any combination of an identifier of the application layer measurement configuration, a service type, a measurement priority, a visibility indicator, or the like. For example, the indicated identifier of the application layer measurement configuration may be carried in the indication information #0, to indicate the first application layer measurement configuration. In this case, in step 501, the node 1 may further send an identifier of each application layer measurement configuration to the UE, where the identifier may be a QoE reference or an application layer measurement identifier, so that the UE learns of the identifier of each application layer measurement configuration. It may be understood that, in the descriptions of embodiment shown in FIG. 4, there is a correspondence between the QoE reference and the application layer measurement identifier. For example, the application layer measurement identifier may be partial information in the QoE reference. For another example, the indicated service type of the application layer measurement configuration may be carried in the indication information #0, to indicate the first application layer measurement configuration. In this case, in step 501, the node 1 may further send the service types corresponding to the application layer measurement configurations to the UE, and the UE reports, by using the node 2, measurement results corresponding to all the application layer measurement configurations of the service types received from the node 1. In an example, when the indication information #0 carries the indicated service types of the application layer measurement configurations, the indication information #0 may further indicate to report measurement results corresponding to the service types to the MN, and/or report measurement results corresponding to the service types to the SN. For example, the indication information #0 may indicate the UE to report measurement results corresponding to a first service type and a second service type to the MN, and report a measurement result corresponding to a third service type to the SN. For another example, the indicated visibility indicator of the application layer measurement configuration may be carried in the indication information #0, to indicate the first application layer measurement configuration. For example, for a first application layer measurement configuration that is visible to the access network side, the visibility indicator is a first value, for example, 1; and for a first application layer measurement configuration that is invisible to the access network side, the visibility indicator is a second value, for example, 0. In this way, a measurement result corresponding to a first application layer measurement configuration that is delivered by the node 1 and that is visible to the access network side may be reported to the node 2, or a measurement result corresponding to a first application layer measurement configuration that is delivered by the node 1 and that is invisible to the access network side may be reported to the node 2, to implement more refined load balancing between nodes. Alternatively, the indicated measurement priority of the application layer measurement configuration may be carried in the indication information #0, to indicate the first application layer measurement configuration. For example, a plurality of measurement priorities correspond to a plurality of values. In this way, a measurement result corresponding to a first application layer measurement configuration with a specific measurement priority that is delivered by the node 1 may be reported to the node 2, to implement more refined load balancing between nodes.

In a possible implementation, the indication information #0 may explicitly indicate "to send the measurement result corresponding to the application layer measurement configuration to the MN of the UE" or "to send the measurement result corresponding to the application layer measurement configuration to the SN of the UE". For example, the indication information #0 may be a 1-bit indication bit. When a value of the indication bit is "0", the indication information #0 may indicate to send the measurement result corresponding to the application layer measurement configuration to the MN of the UE; or when a value of the indication bit is "1", the indication information #0 may indicate to send the QoE measurement result to the SN of the UE. Alternatively, when a value of the indicator bit is "1", the indication information #0 may indicate to send the measurement result corresponding to the application layer measurement configuration to the MN of the UE; or when a value of the indicator bit is "0", the indication information #0 may indicate to send the measurement result corresponding to the application layer measurement configuration to the SN of the UE.

In another possible implementation, when service types corresponding to the application layer measurement configurations that can be configured by the MN and the SN are different, the indication information #0 may implicitly indicate "to send the measurement result corresponding to the application layer measurement configuration to the MN of the UE" or "to send the measurement result corresponding to the application layer measurement configuration to the SN of the UE". For example, when the indication information #0 is a first service type, that is, a service type corresponding to the application layer measurement configuration that can be configured by the MN, the indication information #0 may indicate to send the measurement result to the MN of the UE; or when the indication information #0 is a second service type, the indication information #0 may indicate to send the measurement result to the SN of the UE.

In a second possible implementation, the node 1 may indicate to report, by using the node 2, measurement results corresponding to all application layer measurement configurations delivered by the node 1 to the UE.

In a third possible implementation, the node 1 may indicate to report, by using the node 2, measurement results corresponding to all application layer measurement configurations delivered by the node 1 to the UE within a specific time period.

In a fourth possible implementation, the node 1 may indicate to report, by using the node 2, measurement results corresponding to X application layer measurement configurations delivered by the node 1 to the UE before notification, or Y application layer measurement configurations delivered by the node 1 to the UE after notification. X and Y are both positive integers.

It may be understood that there may be another notification manner. A specific notification manner may be predefined in a protocol, or may be indicated by the node 1 to the UE.

It may be understood that "indicate A" in all embodiments of this application may include "explicitly indicate A" or "implicitly indicate A". The "implicitly indicate A" means that A is indicated by using a correspondence between A and B and by indicating B. The correspondence between A and B may be predefined in a protocol, or may be configured by one of a receiving end and a transmitting end for the other.

Optionally, the indication information #0 in step 502 and the application layer measurement configuration in step 501 may be carried in a same message, or may be carried in different messages. When the indication information #0 and the application layer measurement configuration are carried in different messages, step 502 may be performed before or after step 501. This is not limited in this embodiment.

In some optional implementations, before step 502, the node 1 and the node 2 may further negotiate a specific node for reporting the measurement result. For example, the node 1 may notify the node 2 to send, to the node 2, the measurement result corresponding to the first application layer measurement configuration delivered by the node 1, or the node 2 may request the node 1 to send, to the node 2, the measurement result corresponding to the first application layer measurement configuration delivered by the node 1, or the node 1 may notify the node 2 to send, to the node 2, a measurement result of a specific service type, or the node 2 may request the node 1 to send, to the node 2, a measurement result of a specific service type.

Optionally, the node 1 and the node 2 may further exchange an MCE IP address corresponding to the first application layer measurement configuration. For example, in the foregoing process of negotiating a specific node for reporting the measurement result, the MCE IP address corresponding to the first application layer measurement configuration is exchanged. For example, when the node 1 requests the node 2 to send, to the node 2, the measurement result corresponding to the first application layer measurement configuration delivered by the node 1, the node 1 may send the MCE IP address corresponding to the first application layer measurement configuration to the node 2. In this way, after receiving the measurement result, the node 2 may send, based on the MCE IP address, the measurement result to an MCE corresponding to the MCE IP address. Optionally, the node 1 may further send a QoE reference to the node 2. In this way, the node 2 may send the QoE reference and the measurement result corresponding to the QoE reference to the MCE.

503: The UE reports, to the node 2 based on a notification from the node 1, the measurement result of the first application layer measurement.

Optionally, when reporting the measurement result to the node 2, the UE may carry one or any combination of indication information #1, an identifier of the measurement result, a service type corresponding to the measurement result, a measurement priority corresponding to the measurement result, or a visibility indicator corresponding to the measurement result.

Optionally, the identifier of the measurement result may be an identifier of the first application layer measurement configuration corresponding to the measurement result, for example, a QoE reference or an application layer measurement identifier.

The indication information #1 indicates that the measurement result corresponds to the application layer measurement configuration delivered by the node 1, that is, the first application layer measurement configuration. In this way, the measurement result may be distinguished from a measurement result corresponding to an application layer measurement configuration delivered by the node 2 to the UE. For example, a value of the indication information #1 may indicate a wireless communication standard corresponding to the node 1 or indicate a corresponding role of the node 1 for the UE, for example, an MN or an SN. For example, a first value of the indication information #1, for example, 0, indicates the MN, and a second value of the indication information #1, for example, 1, indicates the SN.

It may be understood that, when service types of QoE measurement configured by the node 1 and the node 2 are different, the service type corresponding to the foregoing measurement result may implicitly indicate that the processing result corresponds to the application layer measurement configuration delivered by the node 1. Therefore, the indication information #1 may not be carried.

For example, in a possible implementation, the indication information #1 may explicitly indicate that "the measurement result is a measurement result corresponding to an application layer measurement configuration configured by the MN" or "the measurement result is a measurement result corresponding to an application layer measurement configuration configured by the SN". For example, the indication information #1 may be a 1-bit indication bit. When a value of the indication bit is "0", the indication information #1 may indicate that the measurement result is the measurement result corresponding to the application layer measurement configuration configured by the MN; or when a value of the indication bit is "1", the indication information #1 may indicate that the measurement result is the measurement result corresponding to the application layer measurement configuration configured by the SN. Alternatively, when a value of the indicator bit is "1", the indication information #1 may indicate that the measurement result is the measurement result corresponding to the application layer measurement configuration configured by the SN; or when a value of the indicator bit is "0", the indication information #1 may indicate that the measurement result is the measurement result corresponding to the application layer measurement configuration configured by the MN.

In another possible implementation, when service types corresponding to the application layer measurement configurations that can be configured by the MN and the SN are different, the indication information #1 may implicitly indicate that "the measurement result is a measurement result corresponding to an application layer measurement configuration configured by the MN" or "the measurement result is a measurement result corresponding to an application layer measurement configuration configured by the SN". For example, when the indication information #1 is a first service type, that is, the service type corresponding to the application layer measurement configuration that can be configured by the MN, the indication information #1 may indicate that the measurement result is the measurement result corresponding to the application layer measurement configuration that can be configured by the MN; or when the indication information #1 is a second service type, that is, the service type corresponding to the application layer measurement configuration that can be configured by the SN, the indication information #1 may indicate that the measurement result is the measurement result corresponding to the application layer measurement configuration that can be configured by the SN.

When a notification from the node 1 indicates to report, to the node 2, measurement results of all application layer measurement configurations of specific service types, and when the UE reports the measurement results of the foregoing application layer measurement configurations to the node 2, the UE may carry the service type corresponding to the measurement result, but does not carry one or a combination of an identifier of the measurement result, the visibility indicator, or the measurement priority.

When a notification from the node 1 indicates to report, to the node 2, measurement results of all first application layer measurement configurations that are visible or invisible to the access network side, and when the UE reports the measurement results of the foregoing application layer measurement configurations to the node 2, the UE may carry the visibility indicator corresponding to the measurement result, but does not carry one or any combination of the identifier of the measurement result, the service type, or the measurement priority.

When a notification from the node 1 indicates to report, to the node 2, measurement results of all first application layer measurement configurations with a specific measurement priority, and when the UE reports the measurement results of the foregoing application layer measurement configurations to the node 2, the UE may carry the measurement priority corresponding to the measurement result, but does not carry one or any combination of the identifier of the measurement result, the service type, or the visibility indicator.

It may be understood that, after receiving the measurement result of the first application layer measurement, the node 2 may send the measurement result to the node 1 by using an interface between the node 2 and the node 1, or send the measurement result to one or any combination of the CN, the OAM, or the EM. For details, refer to the descriptions in step 406 in embodiment shown in FIG. 4.

Before step 503, the method may further include the following step. An access stratum (AS) of the UE sends the application layer measurement configuration received from the node 1 to an upper layer of the AS of the UE. The processes are the same as those described in step 403. Details are not described herein again.

Reporting the measurement result of the first application layer measurement in step 503 is the same as that described in step 404 and step 405. Details are not described herein again.

Optionally, before reporting the measurement result, the upper layer of the access stratum of the UE may obtain the measurement result of the first application layer measurement. For example, the upper layer may receive the application layer measurement result from the application layer, or when the upper layer is an application layer, the upper layer may perform application layer measurement based on the first application layer measurement configuration, to obtain the measurement result. Then, the upper layer may send the measurement result to the access stratum.

For example, the upper layer of the access stratum of the UE may report the measurement result according to a specific rule. In some implementations, the rule may be included in the first application layer measurement configuration. This is not limited in this embodiment of this application. For example, the upper layer may periodically report the measurement result based on a reporting periodicity, or report the measurement result after a session ends. This is not limited in this embodiment of this application.

504: The node 2 sends request information #1 to the node 1, to request to suspend reporting, by using the node 2, the measurement result of the first application layer measurement.

Optionally, the node 2 may request the node 1 to suspend reporting measurement results that correspond to all application layer measurement, that is, the first application layer measurement, and that are delivered by the node 1 to the UE but reported by using the node 2. Alternatively, the node 2 may request the node 1 to suspend reporting measurement results of all application layer measurement, that is, include not only a measurement result corresponding to an application layer measurement configuration delivered by the node 1 but reported to the node 2, but also a measurement result corresponding to an application layer measurement configuration delivered by the node 2 and reported to the node 2. In this case, the node 1 may suspend reporting the measurement results of all the first application layer measurement or all the foregoing application layer measurement without performing additional determining, or the node 1 may perform additional determining and suspend reporting the measurement results of all or some of the first application layer measurement or all the foregoing application layer measurement.

Optionally, the node 2 may request the node 1 to suspend reporting measurement results that correspond to a part of the application layer measurement, that is, the first application layer measurement, and that are delivered by the node 1 to the UE but reported by using the node 2.

Optionally, the node 2 may request to suspend reporting a measurement result of non-specific first application layer measurement that is delivered by the node 1 to the UE but reported by using the node 2. In this case, the node 1 may determine to suspend reporting a measurement result of specific first application layer measurement. The request information #1 sent by the node 2 may indicate only suspension, or may further include a suspend quantity indication #1 for indicating a quantity of first application layer measurement for which measurement result reporting is requested to be suspended.

Optionally, the node 2 may also request to suspend reporting a measurement result of specific first application layer measurement that is delivered by the node 1 to the UE but reported by using the node 2. In this case, the request information #1 may include an identifier of the specific first application layer measurement configuration, so that the node 1 determines to suspend reporting, by the node 2, measurement results of specific first application layer measurement. Optionally, the identifier may be a QoE reference or an application layer measurement identifier. In this case, the node 1 may suspend reporting measurement results that correspond to all the first application layer measurement and that are requested to be suspended from reporting by the node 2 without performing additional determining, or the node 1 may perform additional determining to select all or some of the first application layer measurement for which measurement result reporting to the node 2 is requested to be suspended.

It may be understood that a specific suspension manner may be predefined in a protocol, or may be determined by the node 2 and the node 1 in advance, for example, determined based on an indication of the node 1, the node 2, or another core network element. This is not limited herein.

Optionally, the node 2 determines to suspend reporting measurement results of specific first application layer measurement. The node 2 may determine, based on a priority corresponding to each first application layer measurement, to temporarily report the measurement results corresponding to the specific first application layer measurement. Further, the node 2 may further determine, based on load of a cell that is currently accessed by the UE, to temporarily report the measurement results corresponding to the specific first application layer measurement. Optionally, in this solution, the node 1 may send, to the node 2, one or any combination of the following items corresponding to the first application layer measurement: a service type, a measurement priority, a QoE reference, an application layer measurement identifier, a visibility indicator, and the like. In this way, the node 2 may send, to the node 1, one or any combination of the QoE reference, the application layer measurement identifier, the service type, the measurement priority, the visibility indicator, and the like, to indicate to suspend reporting the measurement results corresponding to the specific first application layer measurement. For example, the node 2 may determine, based on a measurement priority corresponding to the first application layer measurement sent by the node 1, to suspend reporting the measurement results corresponding to the specific first application layer measurement. For another example, the node 2 may calculate load of the UE in one or more serving cells of the current node 2. When the node 1 is an MN, the node 2 is an SN, and load corresponding to a primary secondary cell (PSCell) of the UE is excessively high, the node 2 may notify the node 1 to suspend reporting, by using the node 2, the measurement results of all the first application layer measurement. The PSCell is a cell managed by the SN. When the load corresponding to the PSCell of the UE is high, the node 2 may choose to notify the node 1 to suspend reporting, by using the node 2, a part of the first application layer measurement. For example, the node 2 chooses a part of the first application layer measurement by using a priority. The measurement priority is a priority of each application layer measurement. For example, a higher priority indicates that the application layer measurement is more important. The measurement priority may be determined by a node configured with the application layer measurement, or may be carried in QoE measurement configuration information sent by the CN, the OAM, or the EM to the node. In this case, the CN, the OAM, or the EM may determine the priority of the application layer measurement.

Optionally, that the request information #1 requests to suspend reporting, by using the node 2, the measurement result of the first application layer measurement may include neither reporting to the node 1 nor reporting to the node 2. The measurement result of the first application layer measurement is stored at the AS stratum or the upper layer of the AS stratum of the UE after the reporting is suspended.

Optionally, that the request information #1 requests to suspend reporting, by using the node 2, the measurement result of the first application layer measurement may be implemented by requesting to report, by using the node 1, the measurement result of the first application layer measurement. 505: The node 1 sends request information #2 to the UE, to request to suspend reporting, by using the node 2, the measurement result of the first application layer measurement.

In step 504, that the node 2 requests the node 1 to suspend reporting may include a plurality of cases, for example, suspending reporting results of all the first application layer measurement, suspending reporting a result of specific first application layer measurement, and suspending reporting a result of non-specific first application layer measurement.

In step 505, in response to the request information #1 of the node 2, the node 1 may send the request information #2 to the UE.

Based on the request information #1, the node 1 may determine to request the UE to suspend reporting results of specific first application layer measurement. The first application layer measurement may be all or a part of the first application layer measurement for which the request information #1 requests to suspend measurement result reporting. For example, the node 1 may determine, based on the indication of suspending reporting results of all the first application layer measurement indicated by the request information #1, to suspend reporting the results of all the first application layer measurement, or the node 1 may determine, based on the indication of suspending reporting results of all the first application layer measurement indicated by the request information #1, to suspend reporting the results of all the first application layer measurement and other information such as one or any combination of a measurement priority, a service type, or cell load, to suspend reporting results of all or some of the first application layer measurement. Alternatively, the node 1 may determine, based on the indication of suspending reporting the result of the non-specific first application layer measurement indicated by the request information #1 and other information such as one or any combination of a measurement priority, a service type, or cell load, to suspend reporting the results of all or some of the first application layer measurement, or determine to suspend reporting results of all the first application layer measurement. Alternatively, the node 1 may determine, based on the indication of suspending reporting the result of the specific first application layer measurement, to suspend reporting the result of the specific first application layer measurement, or determine, based on the indication of suspending reporting the result of the specific first application layer measurement indicated by the request information #1 and other information such as one or any combination of a measurement priority, a service type, or cell load, to suspend reporting results of all or a part of the specific first application layer measurement.

The node 1 may request, by using the request information #2, the UE to suspend reporting the result of the first application layer measurement that is determined by the node 1 and that is suspended from reporting.

The first application layer measurement that the node 1 requests the UE to suspend reporting the result may be all the first application layer measurement.

Alternatively, the first application layer measurement that the node 1 requests the UE to suspend reporting the result is specific first application layer measurement. In this case, the request information #2 may include one or any combination of any one of an identifier of a specific first application layer measurement configuration, a service type corresponding to the specific first application layer measurement configuration, a measurement priority corresponding to the specific first application layer measurement configuration, or a visibility indicator corresponding to the specific first application layer measurement configuration, to implement more refined load balancing between nodes. The identifier may be an application layer measurement identifier, that is, an RRC layer identifier, or a QoE reference, that is, a global identifier. It may be understood that, in all embodiments of this application, that the specific first application layer measurement configuration includes one or any combination of the identifier of the specific first application layer measurement configuration, the service type corresponding to the specific first application layer measurement configuration, the measurement priority corresponding to the specific first application layer measurement configuration, or the visibility indicator corresponding to the specific first application layer measurement configuration may be defined in a protocol, or based on a system requirement. This is not limited in this application. For corresponding descriptions of the items, refer to the descriptions in step 502 and step 503. Details are not described again.

In this way, the request information #2 meets one of the following:
  the request information #2 includes one or more of an identifier of the at least one first application layer measurement configuration, a service type, a measurement priority, a visibility indicator, or the like;
  the request information #2 requests the UE to suspend reporting, to the node 2, measurement results corresponding to all first application layer measurement configurations sent by the node 1 to the UE; or
  the request information #2 requests the UE to suspend reporting, to the node 2, measurement results of all application layer measurement configurations, that is, include not only a measurement result corresponding to an application layer measurement configuration delivered by the node 1 but reported to the node 2, but also a measurement result corresponding to an application layer measurement configuration delivered by the node 2 and reported to the node 2.

If the node 1 requests to suspend reporting the measurement results corresponding to all the first application layer measurement, that is, does not need to specify specific application layer measurement one by one, and the measurement results in the suspension process are stored at an upper layer of an RRC layer of the UE, for example, an application layer, after receiving the request information #2, the RRC layer of the UE may carry QoE references or application layer measurement identifiers corresponding to the first application layer measurement when sending the suspension indication to the upper layer of the RRC layer of the UE. In this way, the upper layer of the RRC layer of the UE may learn of measurement results of specific first application layer measurement that need to be suspended from reporting. Optionally, the node 1 further sends indication information #2 to the UE, indicating that the application layer measurement for which result reporting is suspended is the application layer measurement that is delivered by the node 1 to the UE and that corresponds to the measurement result reported by using the node 2, that is, the first application layer measurement. For example, a value of the indication information #2 indicates a wireless communication standard corresponding to the node 1 or indicate a corresponding role of the node 1 for the UE, for example, an MN or an SN. In this way, when different nodes have a same application layer measurement identifier for different application layer measurement, the application layer measurement configurations may be distinguished by using the indicated identifier of the node that delivers the application layer measurement configuration, so that the UE may learn of measurement results of a specific application layer measurement configuration or specific application layer measurement configurations that need to be suspended from reporting.

Optionally, in all embodiments of this application, the suspension of reporting the measurement result of the first application layer measurement by using the node 2 may include the following two suspension manners. Manner 1: The UE neither reports the measurement result of the first application layer measurement by using the node 1, nor reports the measurement result of the first application layer measurement by using the node 2. Manner 2: The UE reports the measurement result of the application layer measurement by using the node 1 instead of reporting the measurement result of the application layer measurement by using the node 2. Optionally, a specific suspension manner in the two suspension manners may be specifically predetermined in a protocol. Optionally, the node 1 or the node 2 may determine a specific suspension manner. For example, the node 1 determines the suspension manner. After the node 1 determines the suspension manner, the node 1 sends indication information #3 to the node 2, indicating a specific suspension manner in the two suspension manners that is used for suspending reporting the result of the specific or non-specific application layer measurement. In this way, the node 2 may subsequently determine a subsequent operation based on the indication information #3. For example, when the suspension manner is to suspend reporting the measurement result of the first application layer measurement to all nodes, after load of the node 2 decreases to a specific extent, the node 2 may request to report again, to the node 2, the measurement result of the first application layer measurement that is suspended from reporting. If the measurement result of the first application layer measurement is reported to the node 1, the node 2 may subsequently not need to request to report the measurement result of the first application layer measurement to the node 2 again. After the node 1 determines the suspension manner, the node 1 may further notify the UE of a current suspension manner in the foregoing two suspension manners. Optionally, when the node 2 determines the suspension manner, the node 2 may notify the UE of a current suspension manner in the foregoing two suspension manners. Further, the node 2 may further notify the node 1 of the current suspension manner in the foregoing two suspension manners. Optionally, the node 2 may provide a suggestion of the used suspension manner for the node 1, and the node 1 further determines whether to use the suspension manner recommended by the node 2. After determining the suspension manner, the node 1 may notify the node 2 of the current suspension manner in the foregoing two suspension manners. In this case, the node 1 notifies the UE of the determined suspension manner.

According to the foregoing step 501 to step 505, it may be implemented that the measurement results of the application layer measurement configurations delivered by the node 1 is reported to the node 2, and the node 2 initiates suspension of reporting the measurement results of the application layer measurement configurations, that is, the first application layer measurement configurations. Step 503 may be optional. For example, due to a load change, the node 2 does not receive the reported measurement result of the first application layer measurement configuration. In other words, before receiving the reported measurement result, the node 2 initiates a suspension procedure.

Further, when the node 2 determines that the node 2 can receive measurement results of more first application layer measurement, the node 2 may further initiate a procedure of resuming reporting the measurement results of the first application layer measurement. The method may include the following step 506 and step 507.

506: The node 2 sends request information #3 to the node 1, to request to resume reporting, by using the node 2, the measurement result of the first application layer measurement.

Implementation of this step may be similar to the descriptions in step 504, and "suspend" in step 504 may be correspondingly changed to "resume". For example, in this step, the node 2 and/or the node 1 may also determine to resume reporting measurement results of specific first application layer measurement, and the first application layer measurement for which the request information #3 requests to resume measurement result reporting may be specific or non-specific.

Optionally, the request information #3 may meet one of the following:

the request information #3 includes one or any combination of identifiers of all or some first application layer measurement configurations in the at least one first application layer measurement configuration, a service type, a measurement priority, or a visibility indicator. For example, the identifier may be a QoE reference or an application layer measurement identifier; or the request information #3 requests to resume reporting a measurement result corresponding to a non-specific first application layer measurement configuration in the first application layer measurement configurations for which measurement result reporting to the node 2 is suspended, or the request information #3 requests to resume reporting the measurement results that correspond to all the first application layer measurement configurations and that are suspended from reporting to the node 2, or the request information #3 includes a resume quantity indication #1 for indicating a quantity of first application layer measurement for which measurement result reporting is requested to be resumed, or the request information #3 requests to resume reporting the measurement results of all the application layer measurement configurations for which measurement result reporting to the node 2 is suspended, that is, include not only a measurement result corresponding to an application layer measurement configuration delivered by the node 1 but reported to the node 2, but also a measurement result corresponding to an application layer measurement configuration delivered by the node 2 and reported to the node 2.

507: The node 1 sends request information #4 to the UE, to request to resume reporting, by using the node 2, the measurement result of the first application layer measurement.

Implementation of this step may be similar to the descriptions in step 505, and "suspend" in step 505 may be correspondingly changed to "resume".

The node 1 sends request information #4 to the UE, and the request information #4 requests the UE to resume reporting, to the node 2, measurement results that correspond to all or some of the first application layer measurement configurations and that are suspended from reporting to the node 2. For example, the request information #4 is sent by the node 1 in response to the received request information #3.

Optionally, the node 1 may send the request information #4 to the UE by using an RRC message.

Optionally, the request information #4 meets one of the following:

the request information #4 includes one or any combination of identifiers of all or some first application layer measurement configurations in the at least one first application layer measurement configuration, a service type, a measurement priority, or a visibility indicator. The identifier may be an RRC layer identifier or a QoE reference;

the request information #4 requests the UE to resume reporting, to the node 2, the measurement results corresponding to all the application layer measurement configurations, where all the application layer measurement configurations include the first application layer measurement configuration; or the request information #4 requests to resume reporting, to the node 2, the measurement results corresponding to all the application layer measurement configurations sent by the node 1 to the UE, that is, the measurement results corresponding to all the first application layer measurement configurations; or the request information #4 requests to resume reporting, to the node 2, the measurement results that correspond to all the application layer measurement configurations and that are suspended from reporting, that is, include not only a measurement result corresponding to an application layer measurement configuration delivered by the node 1 but reported to the node 2, but also a measurement result corresponding to an application layer measurement configuration delivered by the node 2 and reported to the node 2.

Optionally, the node 1 may further send indication information #4 to the UE, to indicate that the measurement result of the first application layer measurement that is delivered by the node 1 to the UE and that is reported to the node 2 is currently recovered. For example, a value of the indication information #4 is delivered by the node 1 and reported by using the node 2, or a value of the indication information #4 indicates a wireless communication standard corresponding to the node 1 or indicate a corresponding role of the node 1 for the UE, for example, an MN or an SN. In this way, when the application layer measurement configurations delivered by different nodes have a same application layer measurement identifier, specific nodes that deliver the application layer measurement configurations may be distinguished, to correctly distinguish the application layer measurement configurations.

Same as the descriptions in step 504, if the node 1 requests to resume reporting, to the node 2, the measurement results corresponding to all the application layer measurement configurations, that is, the first application layer measurement configurations, that is, does not need to specify specific first application layer measurement configurations one by one, and the measurement results in the suspension process may be stored at an upper layer of the RRC layer of the UE, after receiving the request information #4, the RRC layer of the UE may carry one or a combination of an identifier corresponding to the application layer measurement, a service type corresponding to the application layer measurement, a measurement priority, or a visibility indicator when sending the resume indication to the upper layer of the RRC layer of the UE. For example, the identifier may be a QoE reference or an application layer measurement identifier. In this way, the upper layer of the RRC layer of the UE may learn of measurement results of specific application layer measurement that need to be resumed for reporting.

The resumption of reporting the measurement result to the node 2 in the foregoing step 506 and step 507 may alternatively be implemented by indicating to report the measurement result to the node 2. In other words, a signaling message does not explicitly reflect "resumption", but the resumption is reflected by the application layer measurement configuration involved in the signaling being all or a part of the application layer measurement configurations involved in the suspension request. In this case, step 506 and step 507 may not depend on the foregoing step 504 and step 505. In other words, the suspension process may be implemented in a manner different from that described in step 503 and step 504, and the resumption process implemented in step 506 and step 507 may be combined with another suspension manner different from that described in step 503 and step 504.

According to the foregoing step 506 and step 507, the node 2 may request to report, to the node 2, the measurement result corresponding to the application layer measurement configuration that is delivered by the node 1 but reported to the node 2, that is, the first application layer measurement configuration. Therefore, load of the node 1 and the node 2 may be correspondingly adjusted or balanced.

It is learned that step 506 and step 507 may be decoupled from the foregoing step 503 and step 504. In this embodiment of this application, a method is further provided. The method includes the following steps.

506: The node 2 sends request information #3 to the node 1, to request to report, to the node 2, the measurement result of the first application layer measurement.

507: The node 1 sends request information #4 to the UE, to request to report, to the node 2, the measurement result of the first application layer measurement.

The first application layer measurement configuration does not belong to an application layer measurement configuration delivered by the node 2 to the UE, for example, is an application layer measurement configuration delivered by the node 1 to the UE.

The first application layer measurement configuration is a first application layer measurement configuration for which measurement result reporting to the node 2 is suspended.

Optionally, for the foregoing suspension process, refer to the descriptions of the foregoing step 503 and step 504, or the foregoing suspension process is implemented by using a suspension request directly sent by the node 2 to the UE. For this manner, refer to the descriptions in embodiment shown in FIG. 6.

Optionally, for the foregoing first application layer measurement configuration and a process in which the first application layer measurement configuration is indicated to report the measurement result to the node 2, refer to the foregoing descriptions of step 501 and step 502. Details are not described herein again.

According to the method, the reporting, to the node 2, the measurement result corresponding to the application layer measurement configuration delivered by the node 1 may be resumed, to implement more flexible air interface load balancing.

It may be understood that, when the node 1 learns that load of the UE in one or more serving cells of the node 2 exceeds a specific threshold, the node 1 may also initiate a procedure of suspending or resuming reporting the measurement result to the UE. The procedure is similar to a procedure of suspending or resuming reporting a measurement result initiated by the node 2, for example, includes the foregoing step 501 to step 503 and step 505 and/or step 507. The specific descriptions of the steps are the same as the foregoing descriptions. Details are not described herein again. In other words, step 504 and/or step 506 are not included, and the node 1 directly initiates, to the UE, a procedure of suspending or resuming reporting the result of the first application layer measurement.

Figure 6:
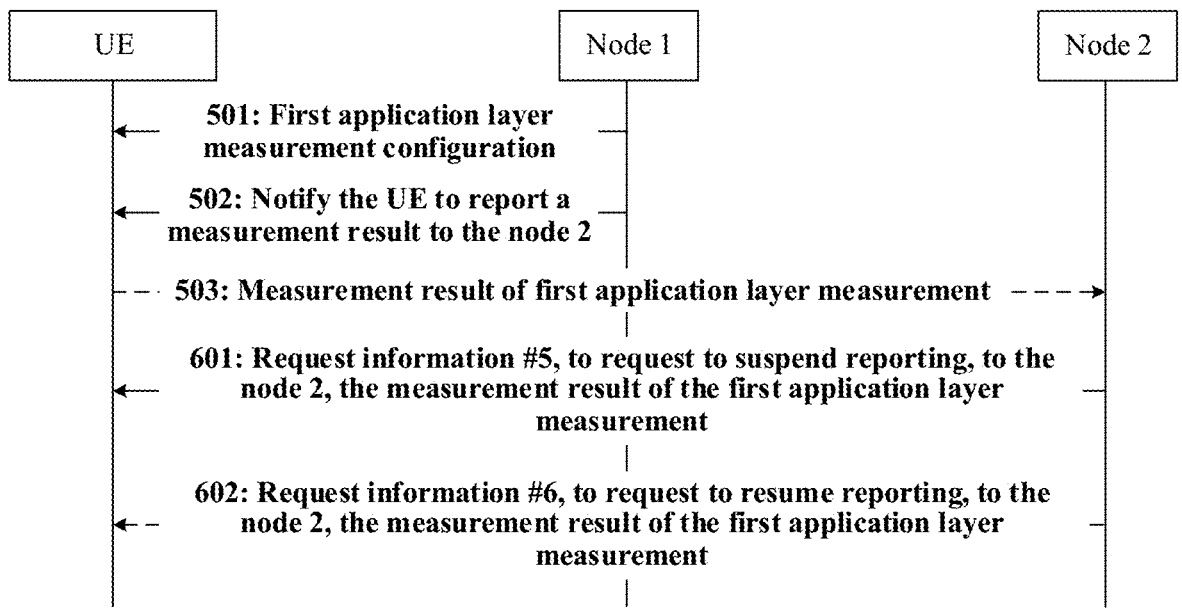
FIG. 6 is a schematic flowchart of another application layer measurement collection method according to an embodiment of this application.

In embodiment shown in FIG. 5, the node 2 requests the node 1 to suspend or resume reporting the result of the first application layer measurement. This application further provides another embodiment. As shown in FIG. 6, an application layer measurement collection method is provided. The method includes the following steps.

601: The node 2 sends request information #5 to the UE, to request to suspend reporting, by using the node 2, the measurement result of the first application layer measurement.

The first application layer measurement is the same as the descriptions in FIG. 5, that is, the first application layer measurement configuration does not belong to the application layer measurement configuration sent by the node 2 to the UE.

Optionally, before step 601, step 503 in embodiment shown in FIG. 5 may be included, that is, the node 2 receives the measurement result of the first application layer measurement from the UE. For details, refer to the descriptions in FIG. 5. Details are not described herein again.

Optionally, before step 601, step 501 and step 502 in embodiment shown in FIG. 5 may be included, that is, the UE receives a notification that is from the node 1 and that is of reporting the first application layer measurement configuration and the measurement result of the first application layer measurement to the node 2. Optionally, the measurement result includes an identifier of the first application layer measurement configuration corresponding to the measurement result.

The first application layer measurement is an application layer measurement configured by the node 1 for the UE but a measurement result is reported by the node 1 to the node 2. The first application layer measurement has a configuration and a measurement result corresponding to the first application layer measurement. Both the configuration and the measurement result of the first application layer measurement may be identified by using the identifier corresponding to the first application layer measurement. The identifier corresponding to the first application layer measurement may be a QoE reference, that is, a global identifier, or a first application layer measurement identifier, that is, an identifier allocated by an RRC layer to the first application layer measurement.

Optionally, the node 2 may determine, based on load of the UE in a serving cell of the node 2, whether to suspend reporting or suspend reporting measurement results corresponding to specific first application layer measurement, or suspend reporting, by using the node 2, the measurement results corresponding to all the first application layer measurement, that is, does not need to specify specific first application layer measurement one by one.

Optionally, the request information #5 meets one of the following:

the request information #5 includes one or any combination of an identifier of the first application layer measurement configuration for which measurement result reporting is requested to be suspended, a service type, a measurement priority, or a visibility indicator;

the request information #5 requests to suspend reporting, to the node 2, the measurement results corresponding to all the first application layer measurement configurations; or the request information #5 includes a suspend quantity indication #2 for indicating a quantity of first application layer measurement configurations for which measurement result reporting is requested to be suspended.

When the request information #5 indicates the quantity of first application layer measurement configurations for which measurement result reporting is requested to be suspended, the UE may further determine and select a corresponding quantity of first application layer measurement configurations from the plurality of first application layer measurement configurations to suspend reporting the measurement results.

Before step 601, the node 1 sends, to the node 2, one or any combination of a service type, a measurement priority, a QoE reference, an application layer measurement identifier, a visibility indicator, or the like that corresponds to the first application layer measurement configuration. In this way, the node 2 may determine, based on the information about the first application layer measurement configuration, to suspend reporting the measurement results corresponding to specific first application layer measurement configurations.

Optionally, the request information #5 sent by the node 2 to the UE may include indication information #5-1, where the indication information #5-1 is one or any combination of the service type, the QoE reference, the application layer measurement identifier, the measurement priority, or the visibility indicator, and is used to indicate to suspend reporting measurement results of specific first application layer measurement. Optionally, the request information #5 may further carry indication information #5-2, indicating that the application layer measurement configuration for which measurement result reporting is suspended is configured by the node 1. For example, a value of the indication information #5-2 indicates a role of the node 1 providing a service for the UE, for example, an MN or an SN. That is, the request information #5 indicates the UE to suspend reporting the measurement result of the application layer measurement that is configured by the node 1 and indicated by the indication information #5-1.

If the node 2 requests to suspend reporting the measurement results corresponding to all the first application layer measurement reported by using the node 2, that is, does not need to specify specific application layer measurement one by one, and the measurement results in the suspension process are stored at an upper layer of an RRC layer of the UE, for example, an application layer, after receiving the request information #5, the RRC layer of the UE may carry QoE references or application layer measurement identifiers corresponding to the first application layer measurement when sending the suspension indication to the upper layer of the RRC layer of the UE. In this way, the upper layer of the RRC layer of the UE may learn of measurement results of specific first application layer measurement that need to be suspended from reporting.

Optionally, in this embodiment, the suspension of reporting the measurement result of the first application layer measurement by using the node 2 may include two suspension manners. Manner 1: The UE neither reports the measurement result of the first application layer measurement to the node 1, nor reports the measurement result of the first application layer measurement to the node 2. Manner 2: The UE reports the measurement result of the first application layer measurement to the node 1 instead of reporting the measurement result of the first application layer measurement to the node 2. Specific descriptions are the same as those in embodiment shown in FIG. 5. Details are not described herein again.

Further, the method may further include step 602: The node 2 sends request information #6 to the UE, to request to resume reporting, by using the node 2, the measurement result of the first application layer measurement that is suspended from reporting.

It may be understood that step 602 may not depend on step 601, that is, step 602 may be decoupled from the suspension process described in step 601. For example, the resumption process in step 602 may be combined with another suspension process, and the other suspension processes are, for example, step 504 and step 505 shown in FIG. 5. In view of this, an embodiment of this application further provides a method. The method includes the following step.

602: The node 2 sends request information #6 to the UE, to request to report, by using the node 2, the measurement result of the first application layer measurement that is suspended from reporting.

Optionally, the method further includes the foregoing step 601, that is, the first application layer measurement for which measurement result reporting is suspended is indicated to the UE based on the foregoing step 601.

In this way, the resumption of the first application layer measurement for which measurement result reporting to the node 2 is suspended may be implemented, to implement more flexible and more refined adjustment of air interface load.

For specific descriptions of step 602 or step 601, refer to the foregoing descriptions. Details are not described herein again.

Optionally, the node 2 may determine, based on load of the UE in a serving cell of the node 2, whether to resume reporting or resume reporting measurement results corresponding to specific first application layer measurement, or resume reporting, by using the node 2, measurement results corresponding to all first application layer measurement, that is, does not need to specify specific first application layer measurement one by one.

Optionally, the request information #6 may meet one of the following:
the request information #6 includes one or any combination of an identifier of the first application layer measurement configuration, a service type, a measurement priority, a visibility indicator, or the like;
the request information #6 requests to resume reporting, to the node 2, a measurement result corresponding to a non-specific application layer measurement configuration in the application layer measurement configurations, for example, the first application layer measurement configuration;
the request information #6 requests to resume reporting the measurement results that correspond to all application layer measurement configurations and that are suspended from reporting to the node 2; or
the request information #6 includes a resume quantity indication #2 for indicating a quantity of first application layer measurement for which measurement result reporting is requested to be resumed.

Optionally, the request information #6 sent by the node 2 to the UE may include indication information #6-1, where the indication information #6-1 is one or any combination of the service type, the QoE reference, the application layer measurement identifier, the measurement priority, or the visibility indicator, and is used to indicate to resume reporting measurement results of specific first application layer measurement. Optionally, the request information #6 may further carry indication information #6-2, indicating that the application layer measurement configured for the node 1 is resumed. For example, a value of the indication information #6-2 indicates a role of the node 1, for example, an MN or an SN. That is, the request information #6 indicates the UE to resume reporting the measurement result of the application layer measurement that is configured by the node 1 and indicated by the indication information #6-1.

Optionally, if the node 2 may request to resume reporting the measurement results corresponding to all the first application layer measurement reported by using the node 2, that is, does not need to specify application layer measurement one by one, and the measurement results in the suspension process are stored at an upper layer of the RRC layer of the UE, for example, an application layer, after receiving the request information #6, the RRC layer of the UE may carry an identifier corresponding to application layer measurement, for example, an identifier of an application layer measurement configuration when sending the resumption indication to the upper layer of the RRC layer of the UE. For example, the identifier may be a QoE reference or an application layer measurement identifier. In this way, the upper layer of the RRC layer of the UE may learn of measurement results of specific application layer measurement that need to be resumed.

Through the foregoing steps, when the node 1 delivers the application layer measurement configuration to the UE and notifies the UE to report the measurement result of the application layer measurement to the node 2, the node 2 may notify, based on a requirement of the node 2, for example, load, the UE to suspend reporting, to the node 2, the measurement result of the application layer measurement, to meet the requirement of the node 2.

It may be understood that in the foregoing embodiments of this application, the method implemented by the access network device may alternatively be implemented by a component (for example, a chip or a circuit) that can be used in the access network device, and the method implemented by the UE may alternatively be implemented by a component (for example, a chip or a circuit) that can be used in the UE. The UE in the foregoing embodiment is merely an example, and may also be another terminal device.

Figure 7:
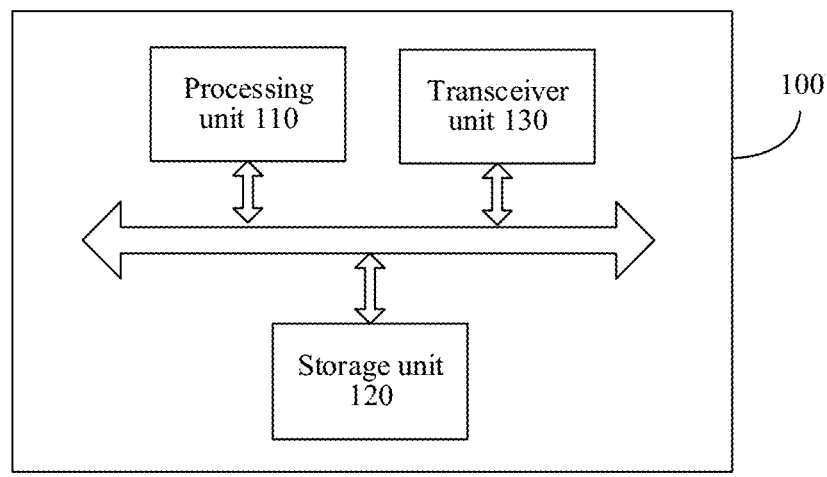
FIG. 7 is a diagram of a structure of a communication apparatus according to an embodiment of this application.

According to the foregoing method, FIG. 7 is a diagram of a wireless communication apparatus 100 according to an embodiment of this application.

In some embodiments, the apparatus 100 may be an access network device, or may be a chip or a circuit, for example, a chip or a circuit that may be disposed in an access network device. In some embodiments, the apparatus 100 may be a terminal device, or may be a chip or a circuit, for example, a chip or a circuit that may be disposed in a terminal device.

The apparatus 100 may include a processing unit 110 (that is, an example of a processor) and a transceiver unit 130.

Optionally, the transceiver unit 130 may be implemented by using a transceiver, a transceiver-related circuit, or an interface circuit.

Optionally, the apparatus may further include a storage unit 120. In a possible manner, the storage unit 120 is configured to store instructions. Optionally, the storage unit may also be configured to store data or information. The storage unit 120 may be implemented by using a memory.

In a possible design, the processing unit 110 may be configured to execute the instructions stored in the storage unit 120, so that the apparatus 100 implements the steps performed by the access network device in the foregoing method.

Further, the processing unit 110, the storage unit 120, and the transceiver unit 130 may communicate with each other by using an internal connection path, to transfer a control signal and/or a data signal. For example, the storage unit 120 is configured to store a computer program, and the processing unit 110 may be configured to invoke the computing program from the storage unit 120 and run the computing program, to control the transceiver unit 130 to receive a signal and/or send a signal, and complete the steps of the access network device in the foregoing method.

In a possible design, the processing unit 110 may be configured to execute the instructions stored in the storage unit 120, so that the apparatus 100 implements the steps performed by the terminal device in the foregoing method.

Further, the processing unit 110, the storage unit 120, and the transceiver unit 130 may communicate with each other by using an internal connection path, to transfer a control signal and/or a data signal. For example, the storage unit 120 is configured to store a computer program, and the processing unit 110 may be configured to invoke the computing program from the storage unit 120 and run the computing program, to control the transceiver unit 130 to receive a signal and/or send a signal, and complete the steps of the terminal device in the foregoing method.

The storage unit 120 may be integrated into the processing unit 110, or may be disposed separately from the processing unit 110.

Optionally, if the apparatus 100 is a communication device, the transceiver unit 130 may include a receiver and a transmitter. The receiver and the transmitter may be a same physical entity or different physical entities. When the receiver and the transmitter are a same physical entity, the receiver and the transmitter may be collectively referred to as a transceiver.

Optionally, if the apparatus 100 is a chip or a circuit, the transceiver unit 130 may include an input interface and an output interface.

In an implementation, a function of the transceiver unit 130 may be implemented by using a transceiver circuit or a dedicated transceiver chip. The processing unit 110 may be implemented by using a dedicated processing chip, a processing circuit, a processing unit, or a general-purpose chip.

In another implementation, it may be considered that the communication device (for example, an access network device or a terminal device) provided in this embodiment of this application is implemented using a general-purpose computer. To be specific, program code for implementing functions of the processing unit 110 and the transceiver unit 130 is stored in the storage unit 120, and a general-purpose processing unit implements the functions of the processing unit 110 and the transceiver unit 130 by executing the code in the storage unit 120.

In some implementations, when the apparatus 100 is a terminal device or a chip or a circuit disposed in a terminal device, the processing unit 110 may be configured to implement the method performed by the UE in the foregoing embodiments. For example, the processing unit 110 may be configured to: receive one or more first application layer measurement configurations from a node 1; receive a notification in which measurement results corresponding to the first application layer measurement configurations from the node 1 are reported to a node 2; and receive request information from the node 1 or the node 2. The request information is first request information for requesting to suspend reporting, to the node 2, measurement results corresponding to all or some of the first application layer measurement configurations sent by the first access network node to the terminal device, and some first application layer measurement configurations include the first application layer measurement configuration, or the request information is second request information for requesting to resume reporting, to the node 2, measurement results corresponding to all or some of the first application layer measurement configurations sent by the first access network node to the terminal device, and some first application layer measurement configurations include the first application layer measurement configuration.

In some implementations, when the apparatus 100 is a first access network device or a chip or a circuit disposed in a first access network device, the processing unit 110 may be configured to implement the method performed by the node 1 in the foregoing embodiments, for example, send at least one first application layer measurement configuration to a terminal device; notify the terminal device to report a measurement result corresponding to the at least one first application layer measurement configuration to a node 2; receive first request information from the node 2, where the first request information requests to suspend or resume reporting, to a second access network node, measurement results corresponding to all or some of first application layer measurement configurations sent by the first access network node to the terminal device, and all the first application layer measurement configurations include the at least one first application layer measurement configuration; and send second request information to the terminal device, where the second request information requests the terminal device to suspend or resume reporting, to the second access network node, the measurement results corresponding to all or some of the first application layer measurement configurations sent by the first access network node to the terminal device, and some first application layer measurement configurations include the at least one first application layer measurement configuration.

In some implementations, when the apparatus 100 is a second access network device or a chip or a circuit disposed in a second access network device, the processing unit 110 may be configured to implement the method performed by the node 2 in the foregoing embodiments, for example, send request information to a node 1 or a terminal device, where the request information requests to suspend or resume reporting, to the node 2, measurement results corresponding to all or some of first application layer measurement configurations sent by the node 1 to the terminal device.

The units in the foregoing embodiment may also be referred to as modules, circuits, or components.

Functions and actions of the modules or the units in the apparatus 100 listed above are merely examples for descriptions. When the apparatus 100 is configured in or is the access network device, the modules or the units in the apparatus 100 may be configured to perform the actions or processing processes performed by the access network device in the foregoing methods. When the apparatus 100 is configured in or is the terminal device, the modules or the units in the apparatus 100 may be configured to perform the actions or processing processes performed by the terminal device in the foregoing methods.

For concepts, explanations, detailed descriptions, and other steps of the apparatus 100 that are related to the technical solutions provided in embodiments of this application, refer to the descriptions of the content in the foregoing methods or other embodiments. Details are not described herein again.

Figure 8:
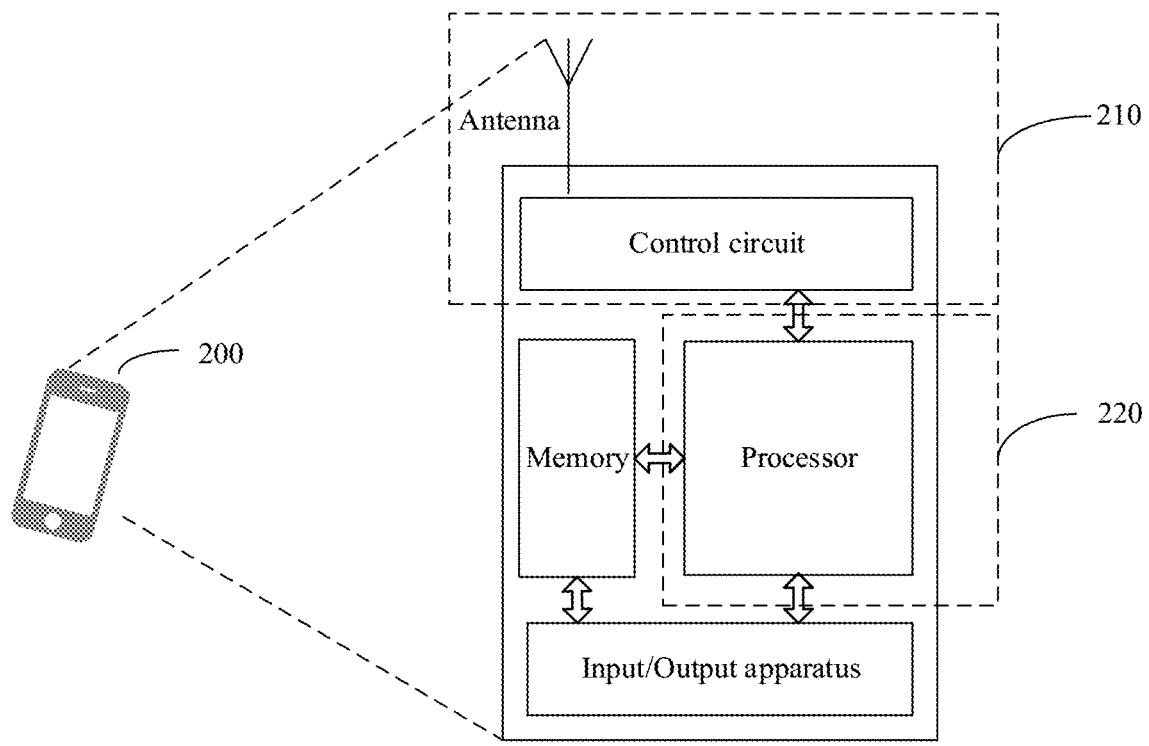
FIG. 8 is a diagram of a structure of a terminal device according to an embodiment of this application.

FIG. 8 is a diagram of a structure of a terminal device 200 according to this application. The terminal device 200 may perform the actions performed by the terminal device in the foregoing method embodiment.

For ease of descriptions, FIG. 8 shows only main components of the terminal device. As shown in FIG. 8, the terminal device 200 includes a processor, a memory, a control circuit, an antenna, and an input/output apparatus.

The processor is mainly configured to process a communication protocol and communication data, control an entire terminal device, execute a software program, and process data of the software program, for example, is configured to support the terminal device in performing the actions described in the application layer measurement collection method in the foregoing embodiments. The memory is mainly configured to store the software program and the data, for example, store a codebook described in the foregoing embodiments. The control circuit is mainly configured to convert a baseband signal and a radio frequency signal and process the radio frequency signal. The control circuit and the antenna together may also be referred to as a transceiver, and are mainly configured to send and receive a radio frequency signal in a form of an electromagnetic wave. The input/output apparatus, such as a touchscreen, a display, or a keyboard, is mainly configured to: receive data input by a user and output data to the user.

After the terminal device is powered on, the processor may read the software program in the storage unit, interpret and execute instructions of the software program, and process data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends, through the antenna, a radio frequency signal in an electromagnetic wave form. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data.

A person skilled in the art may understand that, for ease of descriptions, FIG. 8 shows only one memory and one processor. In an actual terminal device, there may be a plurality of processors and memories. The memory may also be referred to as a storage medium, a storage device, or the like. This is not limited in embodiments of this application.

For example, the processor may include a baseband processor and a central processing unit. The baseband processor is mainly configured to process a communication protocol and communication data. The central processing unit is mainly configured to: control an entire terminal device, execute a software program, and process data of the software program. The processor in FIG. 8 integrates functions of the baseband processor and the central processing unit. A person skilled in the art may understand that the baseband processor and the central processing unit may alternatively be independent processors, and are interconnected by using a technology such as a bus. A person skilled in the art may understand that the terminal device may include a plurality of baseband processors to adapt to different network standards, and the terminal device may include a plurality of central processing units to enhance processing capabilities of the terminal device, and components of the terminal device may be connected by using various buses. The baseband processor may alternatively be expressed as a baseband processing circuit or a baseband processing chip. The central processing unit may alternatively be expressed as a central processing circuit or a central processing chip. A function of processing the communication protocol and the communication data may be built in the processor, or may be stored in the storage unit in a form of the software program, and the processor executes the software program to implement a baseband processing function.

For example, in this embodiment of this application, the antenna and the control circuit that have a transceiver function may be considered as a transceiver unit 210 of the terminal device 200, and the processor that has a processing function may be considered as a processing unit 220 of the terminal device 200. As shown in FIG. 8, the terminal device 200 includes the transceiver unit 210 and the processing unit 220. The transceiver unit 210 may also be referred to as a transceiver, a transceiver machine, a transceiver apparatus, or the like. Optionally, a component that is in the transceiver unit 210 and that is configured to implement a receiving function may be considered as a receiving unit, and a component that is in the transceiver unit 210 and that is configured to implement a sending function may be considered as a sending unit. That is, the transceiver unit includes the receiving unit and the sending unit. For example, the receiving unit may also be referred to as a receiver, a receiver machine, or a receiver circuit, and the sending unit may also be referred to as a transmitter, a transmitter machine, or a transmitter circuit.

Figure 9:
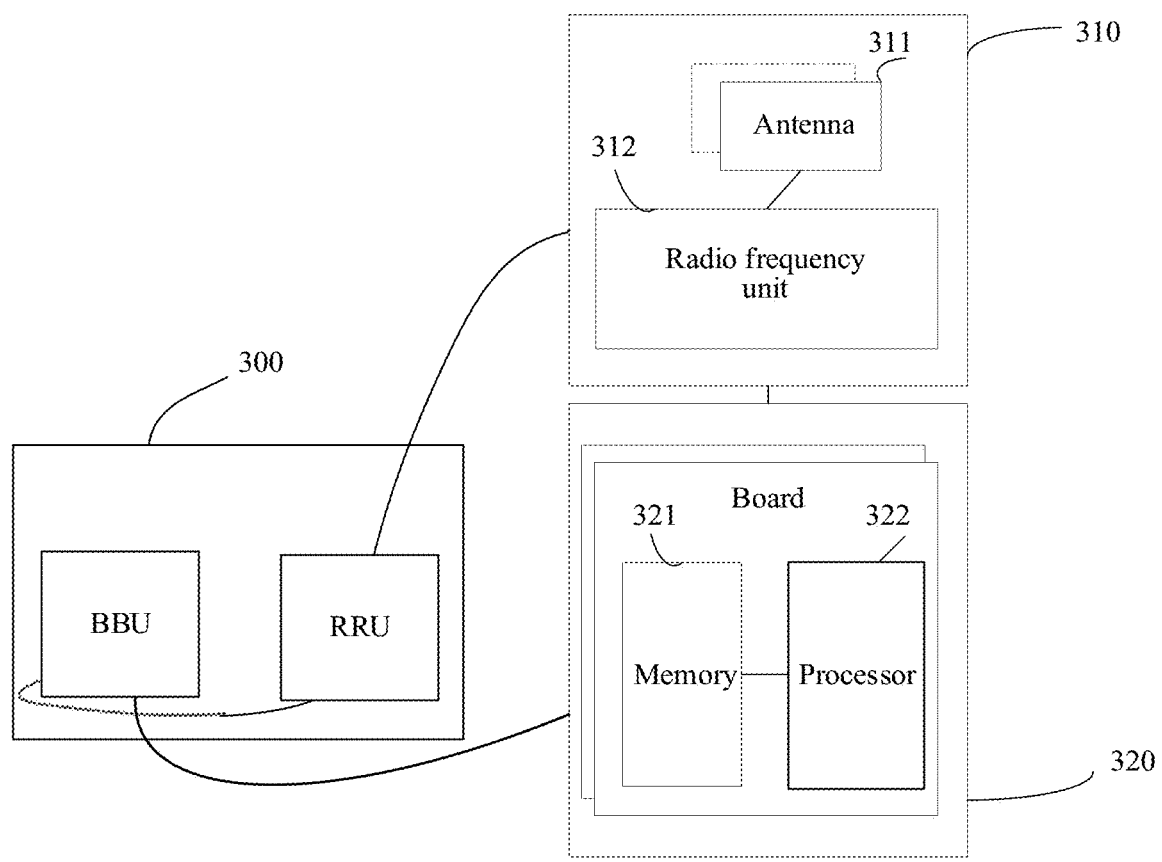
FIG. 9 is a diagram of a structure of a network device according to an embodiment of this application.

FIG. 9 is a diagram of a structure of a network device 300 according to an embodiment of this application. The network device 300 may be configured to implement functions of the access network device (for example, a node 1 and/or a node 2) in the foregoing method. The network device 300 includes one or more radio frequency units, such as a remote radio unit (RRU) 310 and one or more baseband units (BBUs) (which may also be referred to as digital units, DUs) 320. The RRU 310 may be referred to as a transceiver unit, a transceiver machine, a transceiver circuit, a transceiver, or the like, and may include at least one antenna 311 and a radio frequency unit 312. The RRU 310 is mainly configured to: send and receive a radio frequency signal and perform conversion between the radio frequency signal and a baseband signal, for example, is configured to send the signaling message in the foregoing embodiments to a terminal device. The BBU 320 is mainly configured to perform baseband processing, control a base station, and the like. The RRU 310 and the BBU 320 may be physically disposed together, or may be physically separated, that is, a distributed base station.

The BBU 320 is a control center of the base station, may also be referred to as a processing unit, and is mainly configured to implement a baseband processing function such as channel coding, multiplexing, modulation, and spreading. For example, the BBU (processing unit) 320 may be configured to control the access network device to perform an operation procedure related to the access network device in the foregoing method embodiment.

In an example, the BBU 320 may include one or more boards, and a plurality of boards may jointly support a radio access network (such as an LTE system or a 5G system) in a single access standard, or may separately support radio access networks in different access standards. The BBU 320 further includes a memory 321 and a processor 322. The memory 321 is configured to store necessary instructions and data. The processor 322 is configured to control the access network device to perform a necessary action, for example, is configured to control the access network device to perform an operation procedure related to the access network device in the foregoing method embodiment. The memory 321 and the processor 322 may serve the one or more boards. In other words, a memory and a processor may be disposed on each board. Alternatively, a plurality of boards may share a same memory and a same processor. In addition, a necessary circuit may further be disposed on each board.

In a possible implementation, with development of a system-on-chip (SoC) technology, all or some functions of the BBU 320 and the RRU 310 may be implemented by using the SoC technology, for example, implemented by using a base station functional chip. The base station functional chip integrates components such as a processor, a memory, and an antenna interface. A program of a base station-related function is stored in the memory, and the processor executes the program to implement the base station-related function. Optionally, the base station functional chip can also read from an external memory of the chip, to implement the base station-related function.

It should be understood that the structure of the network device shown in FIG. 9 is merely a possible form, but should not constitute any limitation on embodiments of this application. In this application, a possibility that there may be a base station structure in another form in the future is not excluded.

According to the method provided in embodiments of this application, an embodiment of this application further provides a communication system, including the foregoing access network device and terminal device.

It should be understood that, the processor in this embodiment of this application may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be understood that the memory in this embodiment of this application may be a volatile memory or a non-volatile memory, or may include a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative descriptions, many forms of random access memories (RAMs) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by using software, hardware, firmware, or any combination thereof. When software is used to implement embodiments, all or some of the foregoing embodiments may be implemented in a form of a computer program product. The computer program product includes one or more computer instructions or computer programs. When the program instructions or the computer programs are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, a computer, a server, or a data center to another website, computer, server, or data center in a wired (for example, a coaxial cable or an optical fiber) or wireless (for example, infrared, wireless, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), or a semiconductor medium. The semiconductor medium may be a solid-state drive.

An embodiment of this application further provides a computer-readable medium that stores a computer program. When the computer program is executed by a computer, steps performed by the access network device or the terminal device according to any one of the foregoing embodiments are implemented.

An embodiment of this application further provides a computer program product. When the computer program product is executed by a computer, steps performed by the access network device or the terminal device according to any one of the foregoing embodiments are implemented.

An embodiment of this application further provides a system chip. The system chip includes a communication unit and a processing unit. The processing unit may be, for example, a processor. The communication unit may be, for example, an input/output interface, a pin, or a circuit. The processing unit may execute computer instructions, so that the chip in the communication apparatus performs steps performed by the access network device or the terminal device according to the foregoing embodiments of this application.

Optionally, the computer instructions are stored in a storage unit.

An embodiment of this application further provides a communication system, including the access network device and the terminal device in the foregoing embodiments.

Embodiments of this application may be used alone or used in combination. This is not limited herein.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to a magnetic storage component (for example, a hard disk drive, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel, and various other media that can store, contain and/or carry instructions and/or data.

It should be understood that in the foregoing embodiments, terms such as "first" and "second" are merely intended to distinguish different objects, and should not constitute any limitation on this application.

In this application, a specific correspondence may be predefined. For example, the correspondence is pre-stored at a transmitting end and a receiving end in a form of a table or a character string. The pre-stored correspondence may be pre-determined in a protocol. Alternatively, the correspondence may be preconfigured by a transmitting end for a receiving end.

"Predefine" in this application may be understood as "define", "predefine", "store", "pre-store", "pre-negotiate", "preconfigure", "solidify", or "pre-burn".

It should be further understood that the term "and/or" describes an association relationship between associated objects and represents that three relationships may exist. For example, A and/or B may represent the following three cases: Only A exists, both A and B exist, and only B exists. The character "/" generally indicates an "or" relationship between the associated objects. "At least one" means one or more. "At least one of A and B" is similar to "A and/or B", is used to describe an association relationship between associated objects, and represents that there may be three relationships. For example, at least one of A and B may represent the following three cases: Only A exists, both A and B exist, and only B exists.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief descriptions, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk drive, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method applied to a first access network node, the method comprising:
 sending one or more first application layer measurement configurations to a terminal device;
 notifying the terminal device to report a measurement result corresponding to the one or more first application layer measurement configurations to a second access network node;
 receiving first request information from the second access network node, wherein the first request information requests to suspend reporting, to the second access network node, measurement results corresponding to all or a subset of the one or more first application layer measurement configurations sent by the first access network node to the terminal device;

sending second request information to the terminal device, wherein the second request information requests the terminal device to suspend reporting, to the second access network node, the measurement results corresponding to all or the subset of the one or more first application layer measurement configurations sent by the first access network node to the terminal device;

receiving third request information from the second access network node, wherein the third request information requests to resume reporting, to the second access network node, the measurement results that correspond to all or the subset of the one or more first application layer measurement configurations and that are suspended from reporting to the second access network node; and sending fourth request information to the terminal device, wherein the fourth request information requests the terminal device to resume reporting, to the second access network node, the measurement results that correspond to all or the subset of the one or more first application layer measurement configurations and that are suspended from reporting to the second access network node, and the subset of the one or more first application layer measurement configurations comprises the one or more first application layer measurement configurations.

2. The method according to claim 1, wherein notifying the terminal device to report the measurement result corresponding to the one or more first application layer measurement configurations to the second access network node comprises:

sending first indication information to the terminal device, wherein the first indication information indicates to report, to the second access network node, the measurement result corresponding to the one or more first application layer measurement configurations, and the first indication information comprises a first identifier of the one or more first application layer measurement configurations; or sending the first indication information to the terminal device, wherein the first indication information indicates to report, to the second access network node, measurement results corresponding to all of the one or more first application layer measurement configurations sent by the first access network node to the terminal device.

3. The method according to claim 1, wherein:

the first request information comprises a second identifier of the one or more first application layer measurement configurations; or the first request information requests to suspend reporting, to the second access network node, a measurement result corresponding to a non-specific first application layer measurement configuration in the one or more first application layer measurement configurations sent by the first access network node to the terminal device, or the first request information requests to suspend reporting, to the second access network node, the measurement results corresponding to all of the one or more first application layer measurement configurations sent by the first access network node to the terminal device, or the first request information comprises a suspend quantity indication for indicating a quantity of first application layer measurement configurations for which measurement result reporting to the second access network node is requested to be suspended.

4. The method according to claim 3, wherein the second identifier of the one or more first application layer measurement configurations is all or some of a radio resource control (RRC) layer identifier or a global identifier.

5. A method applied to a terminal device, the method comprising:

receiving, by the terminal device, one or more first application layer measurement configurations from a first access network node;

receiving, from the first access network node, a notification in which a measurement result corresponding to the one or more first application layer measurement configurations is reported to a second access network node;

receiving first request information from the second access network node, wherein the first request information requests to suspend reporting, to the second access network node, measurement results corresponding to all or a subset of the one or more first application layer measurement configurations sent by the first access network node to the terminal device, and the subset of the one or more first application layer measurement configurations comprise the one or more first application layer measurement configurations; and receiving second request information from the second access network node, wherein the second request information requests to resume reporting, to the second access network node, the measurement results that correspond to all or the subset of the one or more first application layer measurement configurations and that are suspended from reporting to the second access network node, and the subset of the one or more first application layer measurement configurations comprises the first application layer measurement configurations.

6. The method according to claim 5, wherein receiving, from the first access network node, the notification in which the measurement result corresponding to the one or more first application layer measurement configurations is reported to the second access network node comprises:

receiving first indication information from the first access network node, wherein the first indication information indicates to report, to the second access network node, the measurement result corresponding to the one or more first application layer measurement configurations, and the first indication information comprises an identifier of the one or more first application layer measurement configurations; or receiving first indication information from the first access network node, wherein the first indication information indicates to report, to the second access network node, the measurement results corresponding to all of the one or more first application layer measurement configurations received from the first access network node.

7. The method according to claim 5, wherein the first request information meets one of the following:

the first request information comprises an identifier of the one or more first application layer measurement configurations; or the first request information requests the terminal device to suspend reporting, to the second access network node, the measurement results corresponding to all of the one or more first application layer measurement configurations received from the first access network node.

8. The method according to claim 5, wherein:
the second request information comprises an identifier of the one or more first application layer measurement configurations; or
the second request information requests the terminal device to resume reporting, to the second access network node, the measurement results corresponding to all of the one or more first application layer measurement configurations received from the first access network node.

9. An apparatus, comprising:
a transmitter;
a receiver;
a processor; and
a memory with instructions stored thereon, wherein the instructions, when executed by the processor, enable the apparatus to:
cause the transmitter to send one or more first application layer measurement configurations to a terminal device, and notify the terminal device to report a measurement result corresponding to the one or more first application layer measurement configurations to a second access network node;
cause the receiver to receive first request information from the second access network node, wherein the first request information requests to suspend reporting, to the second access network node, measurement results corresponding to all or a subset of the one or more first application layer measurement configurations sent by the apparatus to the terminal device;
cause the transmitter to send second request information to the terminal device, wherein the second request information requests the terminal device to suspend reporting, to the second access network node, the measurement results corresponding to all or the subset of the one or more first application layer measurement configurations sent by the apparatus to the terminal device;
cause the receiver to receive third request information from the second access network node, wherein the third request information requests to resume reporting, to the second access network node, the measurement results that correspond to all or the subset of the one or more first application layer measurement configurations and that are suspended from reporting to the second access network node; and
cause the transmitter to send fourth request information to the terminal device, wherein the fourth request information requests the terminal device to resume reporting, to the second access network node, the measurement results that correspond to all of the subset of the one or more first application layer measurement configurations and that are suspended from reporting to the second access network node, and the subset of the one or more first application layer measurement configurations comprise the one or more first application layer measurement configurations.

10. The apparatus according to claim 9, wherein the instructions, when executed by the processor, further enable the apparatus to cause the transmitter to:
send first indication information to the terminal device, wherein the first indication information indicates to report, to the second access network node, the measurement result corresponding to the one or more first application layer measurement configurations, and the first indication information comprises a first identifier of the one or more first application layer measurement configurations; or
send first indication information to the terminal device, wherein the first indication information indicates to report, to the second access network node, the measurement results corresponding to all of the one or more first application layer measurement configurations sent by the apparatus to the terminal device.

11. The apparatus according to claim 9, wherein:
the first request information comprises a second identifier of the one or more first application layer measurement configurations; or
the first request information requests to suspend reporting, to the second access network node, a measurement result corresponding to a non-specific first application layer measurement configuration in the one or more first application layer measurement configurations sent by the apparatus to the terminal device, or the first request information requests to suspend reporting, to the second access network node, the measurement results corresponding to all of the one or more first application layer measurement configurations sent by the apparatus to the terminal device, or the first request information comprises a suspend quantity indication for indicating a quantity of the one or more first application layer measurement configurations for which measurement result reporting to the second access network node is requested to be suspended.

12. The apparatus according to claim 11, wherein the second identifier of the one or more first application layer measurement configurations is all or some of a radio resource control (RRC) layer identifier or a global identifier.

13. An apparatus, comprising:
a receiver;
a processor; and
a memory with instructions stored thereon, wherein the instructions, when executed by the processor, enable the apparatus to cause the receiver to:
receive one or more first application layer measurement configurations from a first access network node,
receive a notification in which a measurement result corresponding to the one or more first application layer measurement configurations is reported to a second access network node,
receive first request information from the second access network node, wherein the first request information requests to suspend reporting, to the second access network node, measurement results corresponding to all or a subset of the one or more first application layer measurement configurations sent by the first access network node to the apparatus, and the subset of the one or more first application layer measurement configurations comprise the one or more first application layer measurement configurations, and
receive second request information from the second access network node, wherein the second request information requests to resume reporting, to the second access network node, the measurement results that correspond to all or the subset of the one or more first application layer measurement configurations and that are suspended from reporting to the second access network node, and the subset of the one or more first application layer measurement configurations comprises the one or more first application layer measurement configurations.

14. The apparatus according to claim 13, wherein the instructions, when executed by the processor, enable to apparatus to cause the receiver to:
- receive first indication information from the first access network node, wherein the first indication information indicates to report, to the second access network node, the measurement result corresponding to the one or more first application layer measurement configurations, and the first indication information comprises an identifier of the one or more first application layer measurement configurations; or
- receive first indication information from the first access network node, wherein the first indication information indicates to report, to the second access network node, measurement results corresponding to all of the one or more first application layer measurement configurations received from the first access network node.

15. The apparatus according to claim 13, wherein:
- the first request information comprises an identifier of the one or more first application layer measurement configurations; or
- the first request information requests the apparatus to suspend reporting, to the second access network node, the measurement results corresponding to all of the one or more first application layer measurement configurations received from the first access network node.

16. The apparatus according to claim 13, wherein:
- the second request information comprises an identifier of the one or more first application layer measurement configurations; or
- the second request information requests the apparatus to resume reporting, to the second access network node, the measurement results corresponding to all of the one or more first application layer measurement configurations received from the first access network node.

* * * * *